US011199409B2

(12) United States Patent
Villien

(10) Patent No.: US 11,199,409 B2
(45) Date of Patent: Dec. 14, 2021

(54) METHOD FOR PROCESSING MEASUREMENTS OF AT LEAST ONE ELECTRONIC SENSOR PLACED IN A HANDHELD DEVICE

(71) Applicants: COMMISSARIAT A L'ENERGIE ATOMIQUE ET AUX ENERGIES ALTERNATIVES, Paris (FR); MOVEA, Grenoble (FR)

(72) Inventor: Christophe Villien, Seyssinet-Pariset (FR)

(73) Assignees: COMMISSARIAT A L'ENERGIE ATOMIQUE ET AUX ENERGIES ALTERNATIVES, Paris (FR); MOVEA, Grenoble (FR)

( * ) Notice: Subject to any disclaimer, the term of this patent is extended or adjusted under 35 U.S.C. 154(b) by 364 days.

(21) Appl. No.: 15/580,897

(22) PCT Filed: Jun. 8, 2016

(86) PCT No.: PCT/FR2016/051365
§ 371 (c)(1),
(2) Date: Dec. 8, 2017

(87) PCT Pub. No.: WO2016/198786
PCT Pub. Date: Dec. 15, 2016

(65) Prior Publication Data
US 2018/0164101 A1    Jun. 14, 2018

(30) Foreign Application Priority Data
Jun. 10, 2015    (FR) ........................................ 1555296

(51) Int. Cl.
*G01C 21/16*    (2006.01)
*G01C 21/20*    (2006.01)
(Continued)

(52) U.S. Cl.
CPC .......... *G01C 21/165* (2013.01); *G01C 21/16* (2013.01); *G01C 21/206* (2013.01);
(Continued)

(58) Field of Classification Search
CPC ......... H01M 10/0565; H01M 10/0585; H01M 4/505; H01M 4/5825; H01M 4/13;
(Continued)

(56) References Cited

U.S. PATENT DOCUMENTS 9,605,966 B2    3/2017 Villien
2012/0254878 A1* 10/2012 Nachman .............. G06F 1/3293
                                                                                    718/102
(Continued)

FOREIGN PATENT DOCUMENTS

FR    3 004 804 A1    10/2014
FR    3 016 046 A1    7/2015
(Continued)

OTHER PUBLICATIONS

International Search Report dated Aug. 30, 2016 in PCT/FR2016/051365 filed Jun. 8, 2016.
(Continued)

*Primary Examiner* — Yoshihisa Ishizuka
(74) *Attorney, Agent, or Firm* — Oblon, McClelland, Maier & Neustadt, L.L.P.

(57) ABSTRACT

A measurement processing method, wherein: during an operational phase, a second computer executes a first algorithm for estimating a new value of a datum; during a phase when the second computer is unavailable, a first computer determines and records characteristics of a signal measured by a sensor, the number of characteristics determined during the phase being strictly less than the number of intermediate measurements that the first computer establishes during the operational phase; the unavailability phase is stopped at a
(Continued)

time t2 and the method proceeds to an active recovery phase, during which the second computer executes a second algorithm for estimating a value of the datum at a time within the interval [t1; t2] based on the characteristics determined and recorded during the unavailability phase; then the active recovery phase is stopped and the method returns to the operational phase.

17 Claims, 4 Drawing Sheets

(51) Int. Cl.
*G06F 1/3293* (2019.01)
*G06F 3/0346* (2013.01)

(52) U.S. Cl.
CPC .......... *G06F 1/3293* (2013.01); *G06F 3/0346* (2013.01); *Y02D 10/00* (2018.01)

(58) Field of Classification Search
CPC .... H01M 4/62; H01M 10/0525; H01M 4/485; H01M 4/0404; H01M 4/525; H01M 4/139; H01M 2300/0085; H01M 4/1397; H01M 2004/023; H01M 4/1391
See application file for complete search history.

(56) References Cited

U.S. PATENT DOCUMENTS

| | | | |
|---|---|---|---|
| 2014/0059365 A1* | 2/2014 | Heo | G06F 1/1694 713/320 |
| 2014/0156269 A1* | 6/2014 | Lee | G06F 1/3243 704/231 |
| 2014/0207374 A1* | 7/2014 | Taylor, Jr. | G01C 21/206 701/470 |
| 2015/0346806 A1* | 12/2015 | Dalal | G06F 1/3287 713/2 |
| 2016/0084656 A1 | 3/2016 | Villien | |
| 2017/0003721 A1 | 1/2017 | Villien | |

FOREIGN PATENT DOCUMENTS

| | | |
|---|---|---|
| WO | 2012/167367 A1 | 12/2012 |
| WO | 2014/170618 A1 | 10/2014 |

OTHER PUBLICATIONS

Straub, Julian, "Pedestrian Indoor Localization and Tracking using a Particle Filter combined with a learning Accessibility Map," Institute for Real-Time Computer Systems, Aug. 2010, XP055168883, 89 pages.

Spassov, Ivan, "Algorithms for Map-Aided Autonomous Indoor Pedestrian Positioning and Navigation," Ecole Polytechnique Federale de Laussanne, Nov. 2007, XP055022079.

Woodman, Oliver, et al., "Pedestrian Localisation for Indoor Environments," ACM, 2008, 10 pages.

Koping, Lukas, et al., "Probabilistic Step and Turn Detection in Indoor Localization," IET, 2014, 7 pages.

Renaudin, Valerie, et al., "Step Lenth Estimation Using Handheld Inertial Sensors," Sensors, vol. 12, 2012, pp. 8507-8525.

* cited by examiner

METHOD FOR PROCESSING MEASUREMENTS OF AT LEAST ONE ELECTRONIC SENSOR PLACED IN A HANDHELD DEVICE

The invention relates to a method for processing the measurements of at least one electronic sensor housed in a portable device that can be carried or worn by a user so as to deduce therefrom the values of a datum at successive instants. The subject of the invention is also an information recording medium, an electronic unit and a device for the implementation of this method.

Such a method is known from application US2012/254878A1. The method of application US2012/254878A1 comprises:

during an active phase:
a first calculator acquires, at instants $t_a$, the measurements of said at least one electronic sensor, and then establishes, at each instant $t_k$, an intermediate measurement on the basis of the measurements acquired at the instants $t_a$, over one and the same time period the instants $t_k$ being less numerous than the instants $t_a$ so that the first calculator thus carries out, during the active phase, a first compression of the measurements of said at least one sensor, at each instant $t_k$, a second calculator executes a first algorithm for estimating a new value $P^i_k$ of the datum, this execution comprising:
the reception of a new intermediate measurement established by the first calculator for this instant $t_k$, this new intermediate measurement being more recent than the intermediate measurement received during the previous execution of the first algorithm, and then
the estimation of the new value $P^i_k$ of the datum on the basis of the new intermediate measurement received, at an instant $t_1$, the stopping of the active phase and the switch to an unavailability phase which lasts several instants $t_k$ and during which the execution by the second calculator of the first algorithm is inhibited, during the unavailability phase, the first calculator:
continues to acquire, at each instant $t_a$, the measurements of the physical quantity carried out by the electronic sensor and to establish, at each instant $t_k$, an intermediate measurement on the basis of the measurements acquired at the instants $t_a$, and
records the intermediate measurements established in a memory, at an instant $t_2$, the stopping of the unavailability phase and the return to the active phase.

The first calculator is often known by the term "sensor processor" or "sensor hub". Such a first calculator is generally already present in any device incorporating an electronic sensor. It is therefore not necessary to add a new calculator, in addition to those already existing, to the device. Typically, this first calculator is used to manage the transfer of the measurements between the electronic sensor and the second calculator. This first calculator is also often used to shape the new measurements or to filter the new measurements before transmitting them to the second calculator. However, the calculational power of this first calculator is often much less significant than that of the second calculator. Thus, this first calculator is often incapable of executing the first algorithm fast enough.

Typically, the second calculator is known by the term "host processor" or "application processor" or "context hub".

The switch to the unavailability phase can correspond to the second calculator being placed on standby or to the execution of the first algorithm being placed on standby because the second calculator must execute other higher priority tasks.

In this text, by "compression" is meant the operation which consists in decreasing the amount of memory used. This compression may entail loss or be lossless. When the compression entails loss, it is not possible to retrieve the totality of the original data on the basis of the data recorded.

On completion of the unavailability phase, the second calculator firstly executes the first algorithm on the intermediate measurements recorded before processing the new intermediate measurements received since the return to the active phase. However, the amount of intermediate measurements recorded during the unavailability phase may be significant. In this case, the processing by the second calculator of the intermediate measurements recorded may appreciably delay the processing of the new intermediate measurements received after the instant $t_2$. This is undesirable.

To limit the number of intermediate measurements recorded in the memory during the unavailability phase and to avoid exceeding the capacity of this memory, application US2012/254878A1 proposes to awaken the second calculator either periodically or each time a particular event occurs. This avoids actually exceeding the capacity of the memory but to the detriment of more frequent execution of the active phase. Frequent execution of the active phase has technical consequences on the operation of the device such as an increase in its electrical consumption or a slowing of the processings carried out for other applications executed by the same second calculator.

In this context, the invention is aimed at proposing such a method for processing the measurements of an electronic sensor which both makes it possible to estimate the value $P^i_w$ of the datum at at least one instant $t_w$ included in the interval $]t_1; t_2]$ while making it possible to limit still more the frequency of returns to the active phase.

Its subject is therefore a method for processing the measurements of at least one electronic sensor as claimed in claim 1.

In the claimed method, during the unavailability phase, the first calculator logs and records characteristics of the measured signal which are less numerous than the intermediate measurements established by this same first calculator during the active phase. Stated otherwise, the rate of compression of the measurements of the sensors during the unavailability phase is higher than the rate of compression of these same measurements during the active phase. Thereafter, before returning to the active phase, the second calculator executes, during an active-wakeup phase, a second algorithm which makes it possible to estimate the value $P^i_w$ of the datum at an instant $t_w$ included in the interval $]t_1; t_2]$ on the basis solely of the characteristics logged by the first calculator during the unavailability phase. Given that, over a period of the same duration, the characteristics logged during the unavailability phase are less numerous than the intermediate measurements, it is possible to remain in the unavailability phase for longer while consuming the same amount of memory. The frequency of the returns to the active phase can therefore be decreased. Moreover, generally, since the number of characteristics logged during the unavailability phase is less than the number of intermediate measurements which would have been established during the same time period, the execution of the second algorithm is faster than that of the first algorithm, thereby accelerating the return to the active phase. The delay in recommencing the active phase is therefore limited.

The embodiments of this method can comprise one or more of the characteristics of the dependent claims.

These embodiments furthermore exhibit the following advantages:

- The fact that the second algorithm estimates the value $P^i_w$ on the basis of characteristics logged both before and after the instant $t_w$ makes it possible to increase the precision of this estimation. Indeed, in contradistinction to the first algorithm, this second algorithm takes into account moreover the characteristics logged after the instant $t_w$.
- The use of the value $P^i_w$ provided by the execution of the second estimation algorithm to initialize the value $P^i_{k-1}$ of the first algorithm makes it possible to initialize this value $P^i_{k-1}$ more precisely since account is then taken of what has occurred during the unavailability phase.
- After the instant $t_2$, initializing the position $P^i_{k-1}$ on the basis of the last position constructed $P^i_{t1}$ before the switch to the unavailability phase and of the path traveled logged during the unavailability phase, makes it possible to initialize this position $P^i_{k-1}$ more precisely.
- By generating several possible initial positions on exit from the unavailability phase on the basis of several respective positions recorded at the time when the calculator toggles to the unavailability phase, it is possible, on completion of the unavailability phase, to reuse the same assumptions on the position of the device as those formulated just before the switch to the unavailability phase. The continuity of these assumptions is thus ensured, despite the existence of an unavailability phase. Stated otherwise, the information loss related to the unavailability phase is limited and therefore location of the device at the time when the active phase is returned to is improved.
- By recording only the M most probable positions just before toggling to the unavailability phase, it is possible to decrease the amount of information stored and the number of assumptions to be processed, but without decreasing the precision of location of the device at the time of exiting the unavailability phase.
- The estimation of the initial position on exiting the unavailability phase by using a second algorithm which corrects the position of each point of the path by taking into account all the other points of the path either situated upstream or downstream of this point, makes it possible to obtain a more precise corrected path.
- By correcting the path logged during the unavailability phase with the aid of the corrective factor for a measurement bias estimated just before toggling to the unavailability phase, it is possible to obtain a more precise corrected path. More precise estimation of the position of the device on exit from the unavailability phase is then obtained.
- The recording of characteristic points of the path instead of all the positions of the device makes it possible to limit the amount of information recorded during this unavailability phase and therefore to save memory space. Moreover, limiting the amount of information recorded makes it possible to accelerate the execution of the second algorithm which estimates the current position of the device on exiting the unavailability phase.
- Identifying further characteristic points in addition to those where a significant change of direction occurs, makes it possible to improve the precision of the logged path.

The subject of the invention is also an information recording medium comprising instructions for executing the method hereinabove when these instructions are executed by an electronic calculator.

The subject of the invention is also an electronic processing unit able to implement the claimed method.

Finally, the subject of the invention is also a device directly transportable in the hand by a human being, this device comprising at least one electronic sensor able to measure a physical quantity, in which the device also comprises the claimed electronic unit, this electronic unit being linked up to this electronic sensor.

The invention will be better understood on reading the description which follows, given solely by way of nonlimiting example, and while referring to the drawings in which.

In these figures, the same references are used to designate the same elements. Hereinafter in this description, the characteristics and functions that are well known to the person skilled in the art are not described in detail.

The exemplary embodiment of the invention is described hereinafter in the particular case of a method for locating a device inside a building. However, the solution described in this particular case applies to any context where the problem set forth in the introduction of this patent application is encountered.

Figure 1:
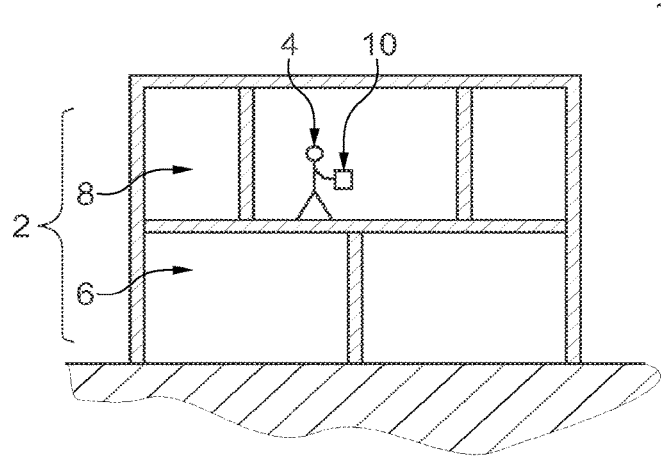
FIG. 1 is a vertical sectional schematic illustration of a building inside which is implemented a method for locating a device.

FIG. 1 represents an assembly comprising a building 2, inside which a pedestrian 4 can move around freely by walking. The building 2 is divided into several stories. Here, only a ground story 6 and a first story 8 are represented. The stories are joined together by zones of change of story such as a staircase or an elevator. Each story comprises rooms and corridors delimited by impenetrable walls through which the pedestrian 4 cannot pass. The pedestrian 4 can enter a room only by passing through a door. Here, the interior of a room can also comprise impenetrable obstacles through which the pedestrian 4 cannot pass such as, for example, pillars or other constructional elements of the building 2.

To aid the pedestrian 4 to locate themselves inside the building 2, the latter transports, for example directly in their hand, a location device 10. The device 10 is capable of locating itself on a map of the building 2 only with the aid of a relative-position sensor. In particular, the device 10 can chart its position inside the building 2 without using a navigation system calling upon external charting beacons, for example beacons implanted in the environment of the building 2. These external beacons may be satellites or radio wave emitters fixed to the building 2. Consequently, the device 10 can chart its position without using a GPS system ("Global Positioning System").

Figure 2A:
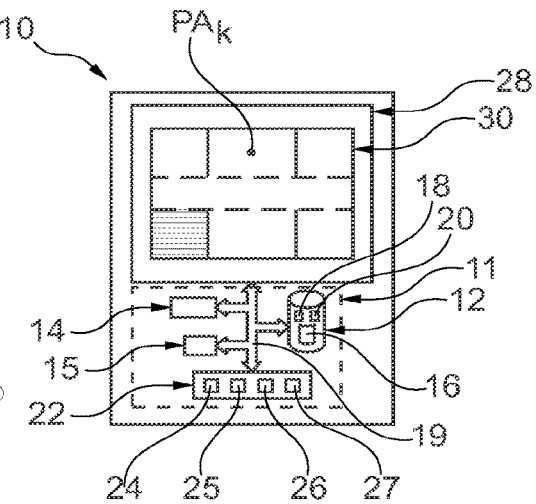
FIG. 2A is a schematic illustration of a location device.

FIG. 2A represents the device 10 in greater detail. The device 10 comprises an electronic calculation unit 11 which is capable, furthermore, of locating the device 10. This unit 11 comprises a memory 12 as well as a main electronic calculator 14 and an electronic calculator 15 dedicated to the processing of the measurements. The calculators 14 and 15 are programmable calculators each capable of executing instructions recorded in a memory. Typically, these are microprocessors. The calculator 14 is known by the term "host processor" or "application processor". It is configured to execute the various operations required for the general and normal operation of the device 10. For this purpose, the calculator 14 is linked up to a memory 12. The memory 12 is known by the term "host memory". The memory 12 comprises the instructions required to execute the method of FIG. 4. Moreover, the memory 12 comprises at least:

a map 16 of the building 2,
instructions for executing a first algorithm 18 for estimating the position of the device 10 inside the building 2, and
instructions for executing a second algorithm 20 for estimating the position of the device 10 inside the building 2.

The unit 11 and the map 16 are described in greater detail with reference, respectively, to FIGS. 2B and 3.

The algorithm 18 is an "online" algorithm or an "incremental learning algorithm". The algorithm 18 is also known as a "real-time estimation algorithm". This is an algorithm capable of estimating, at each instant $t_k$, the current position $PA_k$ of the device 10 inside the building 2 by using only the measurements acquired by an inertial platform 22. The instants $t_k$ are the instants at which the algorithm 18 is executed so as to estimate the current position $PA_k$ of the device 10. Typically, two immediately successive instants $t_{k-1}$ and $t_k$ are separated from one another by a duration of greater than 0.01 s or 0.1 s. Here, the algorithm 18 is a particle filter. Particle filters are well known. For example, the reader may refer to the following documents:

patent applications WO2012158441 and U.S. Pat. No. 8,548,738B1,
the article O. Woodman et Al, "*Pedestrian localisation for indoor environments*", ACM, 2008.
the thesis by J. Straub, "*Pedestrian indoor localisation and tracking using a particule filter combined with a learning accessibility map*", thesis, August 2010, Technical university of Munich. This thesis is downloadable at the following address: http://people.csail.mit.edu/jstraub/download/Straub10PedestrianLocalization.pdf. Hereinafter, this thesis is referenced under the term "Straub2010".

Thus, the manner of operation of a particle filter is considered to be known. For example, in this embodiment, the algorithm 18 is that described in the French application filed under the number FR1455575 on Jun. 18, 2014 by the Commissariat à l'énergie atomique et aux énergies alternatives.

It is recalled here that in this application FR1455575, the coordinates of each particle $S^i$ are updated with the aid of a displacement law. The displacement law makes it possible to calculate, on the basis of the direction $\theta_k$ and the amplitude $I_k$ of the displacement of the device 10, acquired at the instant $t_k$, the displacement of the particle $S^i$ from its previous position $P^i_{k-1}$ to its new position $P^i_k$. This displacement is directly correlated with that of the device 10. Typically, this displacement between the positions $P^i_{k-1}$ and $P^i_k$ is identical or very close to that of the device 10 between the instants $t_{k-1}$ and $t_k$. Hereinafter, the exponent "i" is the identifier of the particle and the subscript "k" is the index number of the instant $t_k$ at which the algorithm is executed 18.

When the pedestrian 4 moves by walking on the floor of the story 8, a displacement law is given by the following relations:

$$x^i_k = x^i_{k-1} + v_k * \Delta t * \cos \theta_k;$$

$$y^i_k = y^i_{k-1} + v_k * \Delta t * \sin \theta_k,$$

where:
($x^i_k$, $y^i_k$) and ($x^i_{k-1}$, $y^i_{k-1}$) are the coordinates, in the plane of the floor, of the positions $P^i_k$ and $P^i_{k-1}$ of the particle $S^i$;
$\Delta t$ is the time interval $t_k - t_{k-1}$, and
$v_k$ is the speed of the displacement between the instants $t_k$ and $t_{k-1}$. It is given by the ratio $I_k / \Delta t$.

In the case of a method for locating the device 10 implementing a particle filter, it is beneficial to explore the largest possible number of trajectories with the particles. Thus, conventionally, the displacement of each particle is disturbed in a random manner. For example, accordingly, the usable displacement law is the following:

$$x^i_k = x^i_{k-1} + v_k * \Delta t * \cos \theta_k + \mu^i_x;$$

$$y^i_k = y^i_{k-1} + v_k * \Delta t * \sin \theta_k + \mu^i_y;$$

where $\mu^i_x$ and $\mu^i_y$ are random variables.

At each instant $t_k$ and for each particle $S^i$, the values of these variables $\mu^i_x$ and $\mu^i_y$ are randomly drawn as a function of a predefined centered probability law, that is to say characterized by a zero mathematical expectation. Thus, the mean of the values of each random variable $\mu^i_x$ and $\mu^i_y$ at the various successive instants $t_k$ tends to zero as k increases. For example, this predefined probability law is the same for the random variables $\mu^i_x$ and $\mu^i_y$ and for all the particles $S^i$. Hereinafter, it is denoted $Lp_{xy}$. This law $Lp_{xy}$ is characterized by a predetermined standard deviation $\sigma_{xy}$. Here, the standard deviation $\sigma_{xy}$ is constant and independent of the measurements of the inertial platform 22 for an update at each stride. For example, the standard deviation $\sigma_{xy}$ is greater than 5 cm or 10 cm and, preferably, less than 35 cm. For example, the law $Lp_{xy}$ is a uniform distribution or a Gaussian distribution.

In reality, a measurement bias may also exist, called the direction bias, in the measurement of the direction $\theta_k$. Such a direction bias can originate from a defect in the sensors of the inertial platform 22. This direction bias can also be caused by the fact that the pedestrian 4 does not point the device 10 in their direction of movement. Similarly, a measurement bias may also exist, called the stride bias here, in the measurement of the amplitude $I_k$ of the displacement of the device 10. This stride bias can originate from a defect of the sensors of the inertial platform 22 or from a modeling error. Typically, these biases are constant at least for a time interval long enough to be able to estimate them and correct them as described hereinafter.

Here, to compensate and correct these direction and stride biases, the displacement law used integrates corrective factors, respectively $\alpha^i$ and $\epsilon^i$ associated with each particle $S^i$. For example, the displacement law is given by the following relations:

$$x^i_k = x^i_{k-1} + v^i_k * \Delta t * (1+\epsilon^i_k) * \cos(\theta_k + \alpha^i_k) + \mu^i_x;$$

$$y^i_k = y^i_{k-1} + v^i_k * \Delta t * (1+\epsilon^i_k) * \sin(\theta_k + \alpha^i_k) + \mu^i_y;$$

$$\epsilon^i_k = \epsilon^i_{k-1} + \mu^i_\epsilon;$$

$$\alpha^i_k = \alpha^i_{k-1} + \mu^i_\alpha;$$

where:
- $\epsilon^i_k$ and $\epsilon^i_{k-1}$ are the values, respectively at the instants $t_k$ and $t_{k-1}$, of the corrective factor $\epsilon^i$ used to correct the stride bias, and
- $\alpha^i_k$ and $\alpha^i_{k-1}$ are the values, respectively at the instants $t_k$ and $t_{k-1}$, of the corrective factor $\alpha^i$ used to correct the direction bias,
- $\mu^i_\epsilon$ and $\mu^i_\alpha$ are random variables.

The random variables $\mu^i_\epsilon$ and $\mu^i_\alpha$ are used for the same reasons and in the same manner as the variables $\mu^i_x$ and $\mu^i_y$ introduced previously. Thus, a new value of the variables $\mu^i_\epsilon$ and $\mu^i_\alpha$ is randomly drawn at each new instant $t_k$ and for each particle $S^i$ as a function, respectively, of a predefined probability law $Lp_\epsilon$ and of a predefined probability law $Lp_\alpha$. Typically, these laws $Lp_\epsilon$ and $Lp_\alpha$ are the same for all the particles $S^i$. Here, the mathematical expectations of the laws $Lp_\epsilon$ and $Lp_\alpha$ are equal to zero. Consequently, just as for the random variables $\mu^i_x$ and $\mu^i_y$, the mean of the values of each random variable $\mu^1_\epsilon$ and $\mu^i_\alpha$ at the various successive instants $t_k$ tends to zero as k increases.

Moreover, the function of the variables $\mu^i_\epsilon$ and $\mu^i_\alpha$ is liable only to slightly disturb the previous values $\epsilon^i_{k-1}$ and $\alpha^i_{k-1}$ of the corrective factors $\epsilon^i$ and $\alpha^i$ so that the values of the corrective factors $\epsilon^i$ and $\alpha^i$ remain stable over time. For this purpose, the standard deviations $\sigma_\epsilon$ and $\sigma_\alpha$, respectively, of the laws $Lp_\epsilon$ and $Lp_\alpha$, do not allow a fast variation of the values of the corrective factors $\epsilon^i$ and $\alpha^i$. Here, for this purpose, the standard deviation $\sigma_E$ is chosen sufficiently small for the ratio $\Sigma\sigma_{\epsilon k}/T$ to be less than 10%/s and, preferably, less than 5%/s or 1%/s, where:
- $\sigma_{\epsilon k}$ is the standard deviation of the law $Lp_\epsilon$ during the k-th iteration of step 126 (FIG. 4),
- $\Sigma\sigma_{\epsilon k}$ is the sum of the standard deviations $\sigma_{\epsilon k}$ between the q-th iteration and the p-th iteration of step 126, where q is an integer strictly less than p,
- T is the duration in seconds of the time interval which has elapsed between the q-th and the p-th iteration of step 126.

Here, the standard deviation G, is constant. Thus, the above ratio can also be written: $(p-q)\sigma_\epsilon/T$. In this case, whatever p and q, the ratio is constant. The difference p-q is generally large enough to cover a time period greater than 1 s or 4 s and, generally, less than 10 min or 5 min or 1 min. For example, this difference between p and q is constant whatever p.

Similarly, the standard deviation $\sigma_\alpha$ is chosen sufficiently small for the ratio $\Sigma Z\sigma_{\alpha k}/T$ to be less than 10°/s and, preferably, less than 5°/s or 1°/s, where:
- $\sigma_{\alpha k}$ is the standard deviation of the law $Lp_\alpha$ during the k-th iteration of step 126,
- $Z\sigma_{\alpha k}$ is the sum of the standard deviations $\sigma_{\alpha k}$ between the q-th iteration and the p-th iteration of step 126, where q is an integer strictly less than p,
- T is the duration in seconds of the time interval which has elapsed between the q-th and the p-th iteration of step 126.

Here, the standard deviation $\sigma_\alpha$ is also constant. Thus, the above ratio can also be written: $(p-q)\sigma_\alpha/T$.

Just as for the variables $\mu^i_x$ and $\mu^i_y$, the variables $\mu^1_\epsilon$ and $\mu^1_\alpha$ make it possible to explore a large number of possible values for the corrective factors $\epsilon^i$ and $\alpha^i$.

This displacement law operates particularly well in situations where the pedestrian 4 walks on horizontal ground. On the other hand, the management of the changes of stories is carried out, for example, as described in Straub2010.

The algorithm 20 is an offline algorithm. In contradistinction to a real-time algorithm, the offline algorithm uses all the measurements previously acquired between two instants $t_1$ and $t_2$ to estimate the position $PA_k$ at several instants $t_w$ lying between $t_1$ and $t_2$. For example, the algorithm 20 is a "graph-matching" algorithm such as that described in the following thesis: Ivan Spassov: "Algorithm for Map-Aided Autonomous Indoor Pedestrian Positioning and Navigation", THESIS No. 3961 (2007), submitted on Nov. 23, 2007 to the faculty of natural, architectural and building environment, Topometry laboratory, ÉCOLE POLYTECHNIQUE FÉDÉRALE DE LAUSANNE. Hereinafter, this thesis is referenced under the term "Spassov2007".

The calculator 14 is generally a more powerful calculator than the calculator 15, that is to say capable of executing a larger number of instructions per second. This calculator 14 is also able to toggle between an active phase and an unavailability phase. During the active phase, it has access to a very large amount of information, including in particular the map 16 and it executes high-level applications such as the algorithms 18 and 20. On the contrary, in the unavailability phase, the calculator 14 is incapable of executing the algorithms 18 and 20. The subsequent description of this embodiment is given in the particular case where the unavailability phase corresponds to a phase where the calculator 14 is placed on standby to save energy. In this particular case, typically, the calculator 14 toggles from the active phase to the unavailability phase automatically in the absence of interaction with the pedestrian 4 for a predetermined timespan. The pedestrian 4 interacts with the device 10 by way of a man-machine interface. The calculator 14 can also be placed on standby in response to a command transmitted by the pedestrian 4.

The calculator 15 is programmed to manage, furthermore, the operation and the acquisition of the measurements of the inertial platform 22. The calculator 15 can also perform limited processings on the measurements acquired. On the other hand, it is incapable of executing the algorithms 18 and 20 since the latter require calculational power which the calculator 15 does not have. On the other hand, the calculator 15 transmits the measurements, optionally processed locally, to the calculator 14 if the latter is in its active phase. Because of its more limited calculational power, the calculator 15 consumes much less energy than the calculator 14 in order to operate. Thus, here, the calculator 15 is continuously powered as long as the device 10 is switched on. For example, it operates continuously as long as it is necessary to locate the device 10 in the building 2. The calculator 15 also has access to less information than the calculator 14. For example, the calculator 15 cannot access the map 16 recorded in the memory 12.

The device 10 comprises the inertial platform 22. The inertial platform 22 housed inside the device 10 measures the direction of movement and the amplitude of the displacement of this device in a direction from a previous position of this same device. An inertial platform is a relative-position sensor since it makes it possible only to estimate a new position of the device with respect to its previous position. Thus, to correctly estimate the position of the device at an instant $t_k$, it is absolutely essential to know the previous position occupied at the instant $t_{k-1}$. Conversely, a position sensor, such as a GPS (Global Positioning System) sensor, is an absolute-position sensor since it is capable of estimating the position of the device without having any knowledge about the previous position of this same device. Here, the inertial platform 22 comprises an accelerometer 24, a gyrometer 25 and a magnetometer 26. The sensors can be three-axis sensors. Moreover, in this embodiment, the inertial platform 22 also comprises a barometer 27 to measure the altitude of the device 10.

Location of the device 10 on the basis of the measurements of the inertial platform poses particular problems that are not encountered with the use of absolute-position sensors. In particular, it is generally complex to use directly and only the measurements of a relative-position sensor to locate the device since, in this case, the device location errors accumulate over time. The location thus obtained then rapidly becomes unexploitable. It is therefore necessary to be capable of regularly correcting this location, but without resorting to an absolute-position sensor. Various solutions have been proposed. For example, to correct and improve the estimation of the position of the device, it is known to exploit the fact that predefined constraints on the displacements of the device inside the building 2 exist. For example, a typical constraint is that a displacement cannot pass through a wall. Here, it is the map 16 which contains these predefined constraints on the displacements of the device 10 inside the building 2.

The inertial platform 22 transmits to the calculator 15, by way of an information transmission bus 19, measurements representative of the direction in which the device 10 is moving and of the amplitude of the displacement in this direction from the last position logged for this device 10.

The device 10 is equipped with a man-machine interface comprising in particular a screen 28 making it possible to display a graphical representation 30 of the map 16 and, on this graphical representation, a point $PA_k$ representing the current position of the device 4 inside the building 2. This point $PA_k$ is therefore situated in the graphical representation 30 at the place on the map 16 corresponding to the current position of the device 10 and therefore of the pedestrian 4.

Figure 4:
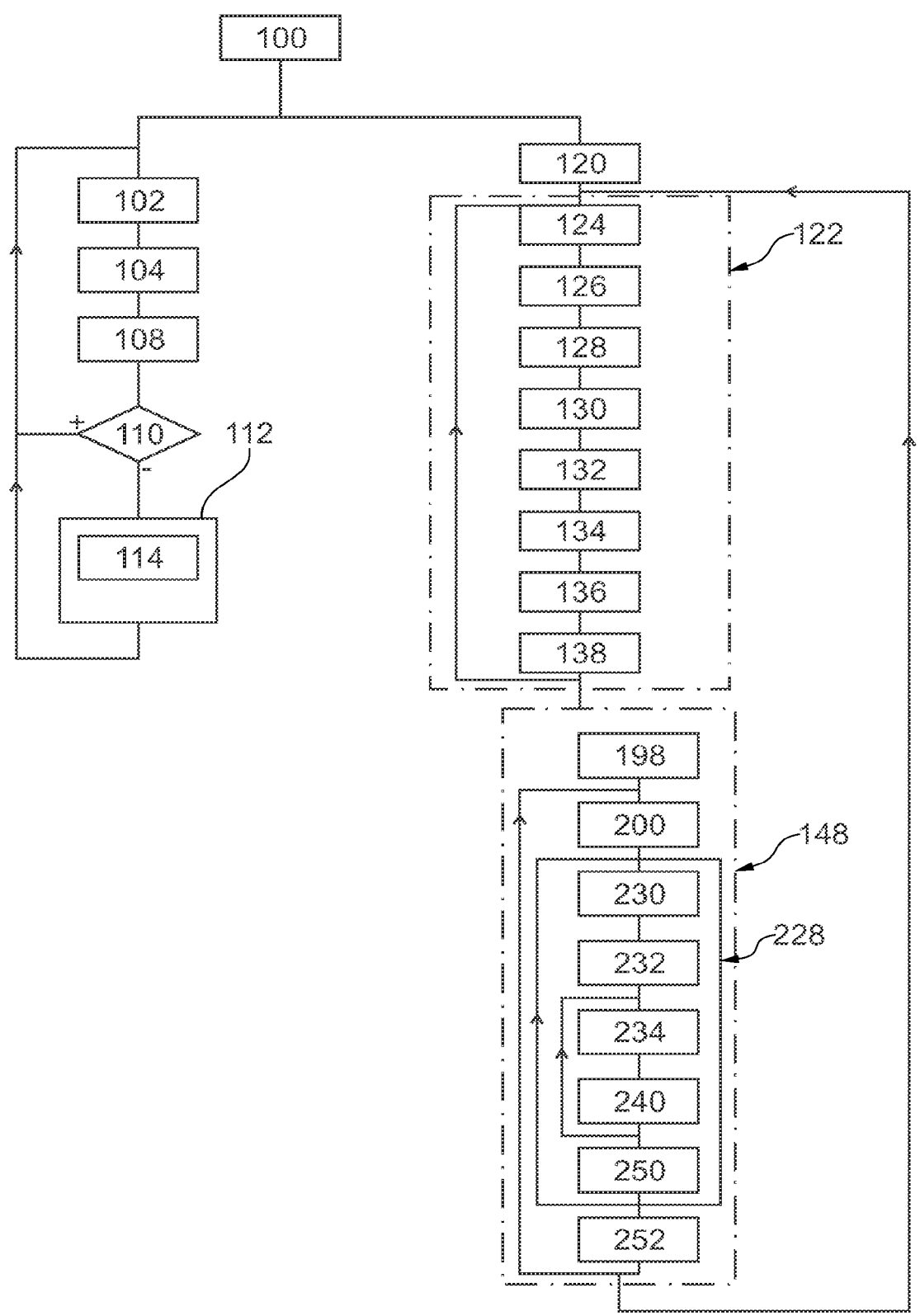
FIG. 4 is a flowchart of a location method implemented by the device of FIG. 2A.

For example, in this embodiment, the device 10 is a telephone or an electronic tablet programmed to execute the method of FIG. 4.

Figure 2B:
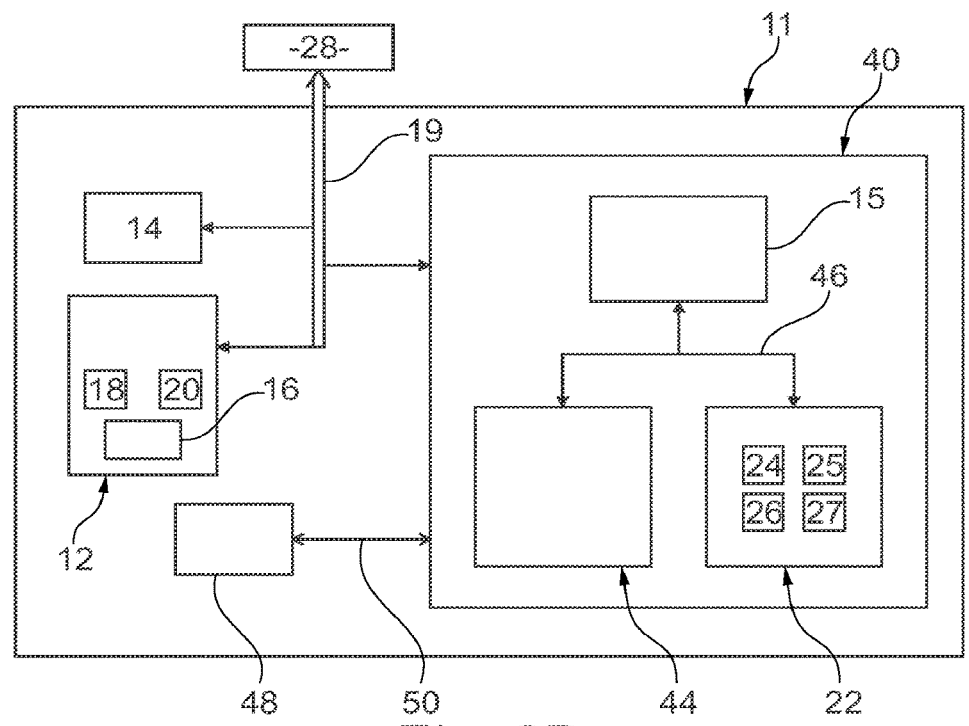
FIG. 2B is a schematic illustration of an embodiment of a calculation unit of the device of FIG. 2A.

FIG. 2B represents in greater detail a possible embodiment of the calculation unit 11. The unit 11 comprises a displacement processing unit designated here by the acronym MPU (Motion Processing Unit) 40. The MPU 40 comprises internal sensors. Here, these internal sensors correspond to those of the inertial platform 22. An internal sensor is typically a MEMS (MicroElecroMechanical System) integrated on the chip which forms the MPU 40 or integrated into the same insulating shrouding as that which shrouds the other elements of the MPU 40.

The calculator 14, the memory 12 and the MPU 40 are linked up to one another by the bus 19. For example, the bus 19 is a PCIe (Peripheral Component Interconnect Express) bus, a USB (Universal Serial Bus) bus, a UART (Universal Asynchronous Receiver/Transmitter (UART) serial bus, an AMBA (Advanced Microcontroller Bus Architecture) interface, an I2C (Inter-Integrated Circuit) bus, an SDIO (Serial Digital Input Output) bus or other similar bus. Moreover, signals for additional signaling can be used in addition to the bus 19 such as an interrupt line or the like. Further details on the realization of the calculator 14 and of the memory 12 can be found in the application filed on Jun. 6, 2007 under the number U.S. Ser. No. 11/774,488, and in application U.S. Ser. No. 12/106,921, filed on Apr. 11, 2008. Further details on the realization of the unit 40 are available from the company InvenSense Inc in California.

In this embodiment, in addition to the sensors 24 to 27, the MPU 40 comprises the calculator 15 and an internal memory 44. The memory 44 stores instructions executable by the calculator 15 for the implementation of the method of FIG. 4. The memory 44 is also usable to record the data measured by the sensors 24 to 27. For example, the memory 44 comprises a FIFO (first in, first out) buffer memory to record a set of the measurements carried out by the sensors 24 to 27. The MPU 40 also comprises a bus 46 which links together the calculator 15, the sensors 24 to 27 and the memory 44. The bus 46 is for example similar or identical to the bus 19. The memory 44 stores, for example, a single sample of the measurements at the same measurement instant. This sample is thereafter recovered by the calculator 14 before being replaced with a new sample containing more recent measurements. Accordingly, for example, the MPU 40 signals to the calculator 14 that a new sample of measurements is available by dispatching an interrupt signal to the calculator 14. In this embodiment, the frequency at which the interrupt signal is transmitted to the calculator 14 can depend on the period of sampling of the measurements. Thus, an interrupt signal is transmitted to the calculator 14 after the recording of each new sample in the memory 44 or after the recording of a predetermined number greater than two of new samples in the memory 44. In the latter case, the memory 44 can simultaneously store several successive samples of measurements. The mode of operation which has just been described in the particular case of the internal sensors 24 to 27 can also apply to the measurements of external sensors 48 linked up to the MPU 40 by a bus 50. The external sensors 48 can be situated and integrated inside the unit 11 or situated on another remote device. The remote device can be a bracelet, a watch or another portable remote device that the user can carry or wear. This remote device is linked up to the device 10 by a wire link or a wireless link. The number of external sensors 48 may be arbitrary. They may involve an accelerometer, a gyroscope, a magnetometer, a barometer, a hydrometer, a thermometer, a microphone, a proximity sensor or a luminous intensity sensor or other sensors.

Figure 3:
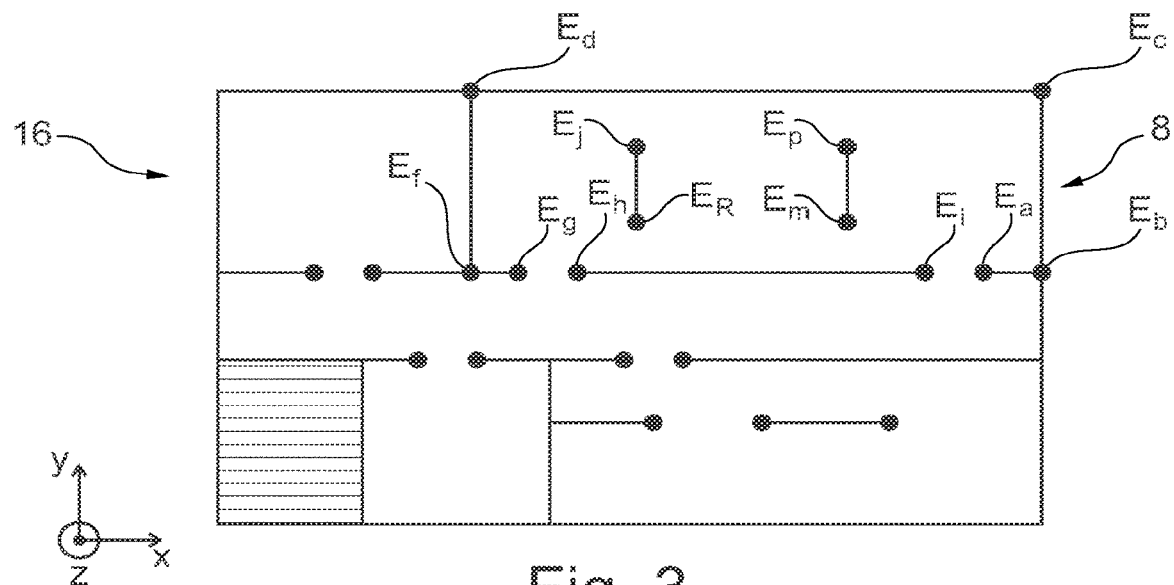
FIG. 3 is a schematic illustration of a set of constraints used to locate the device of FIG. 2A in the building of FIG. 1.

FIG. 3 graphically represents an exemplary content of the map 16 for the story 8 of the building 2. What will now be described for the story 8 of the building 2 applies to each story of this building and to the ground story 6.

The plane of the story 8 is typically horizontal. The map 16 is similar to that described in the French application filed under the number FR1455575. Thus, only the details required for the understanding of the invention are given.

The XYZ frame is an orthogonal frame in which the directions X and Y are horizontal and the direction Z is vertical.

In FIG. 3, the periphery of each room is delimited by walls represented by thin lines. These walls are obstacles that are impenetrable to the pedestrian 4. Moreover, each room comprises at least one opening for access to the interior of this room. In FIG. 3, the openings are situated between the ends, marked by dots, of the walls. An opening is typically a door. A room can also contain other obstacles that are impenetrable to the pedestrian 4. For example, an impenetrable obstacle is an interior partition or a pillar or any other element of the building 2 that the pedestrian 4 cannot cross. Each impenetrable object constitutes a constraint on the displacement of the device 10 inside the building 2.

In this map 16, the position and the dimensions of each impenetrable object are coded by a horizontal segment contained in the plane of the floor. Thus, each obstacle identifier is associated with a pair of points $E_{jd}$ and $E_{jf}$. The points $E_{jd}$ and $E_{jf}$ mark respectively, the start and the end of the segment [$E_{jd}$; $E_{jf}$], where j is the identifier of the impenetrable obstacle. The coordinates of the points $E_{jd}$ and $E_{jf}$, in the plane of the floor, are known and contained in the map 16. In FIG. 3, a few points $E_a$ to $E_R$ are represented.

The manner of operation of the device 10 will now be described with reference to the method of FIG. 4 and with the aid of FIGS. 5 to 8.

At an instant $t_0$, during a step 100, the pedestrian 4 manually triggers the execution by the unit 11 of the method for locating the device 10 inside the building 2. The calculator 14 is then in its active phase or toggles into its active phase.

Thereafter, during a step 102, the inertial platform 22 measures, at each instant $t_a$, the physical quantities such as the acceleration, the direction of the magnetic field, the rotation speed of the device 10 and the atmospheric pressure. The frequency of the instants $t_a$ is higher and, typically twice or ten or a hundred or a thousand times higher, than that of the instants $t_k$.

During a step 104, the calculator 15 acquires, at this frequency higher than that of the instants $t_k$, the measurements of the inertial platform 22. Next, in this embodiment, it executes an algorithm for detecting a stride of the pedestrian 4 on the basis of the measurements of the accelerometer. Indeed, each time the pedestrian 4 places a foot on the ground, this corresponds to a characteristic temporal evolution of the measured acceleration. The calculator 15 uses this characteristic temporal evolution to detect the instant $t_p$ at which the pedestrian 4 places a foot on the ground. For example, the reader may refer to the patent application filed under the number FR14050950, on Jul. 5, 2014 by the applicant and entitled "Procédé et dispositif de comptage de pas" [Method and apparatus for counting strides].

During step 108, the calculator 15 establishes the measurements of the direction $\theta_k$ and of the amplitude $I_k$ of the displacement of the device 10 at the instant $t_p$ and then records them in the memory 44. These measurements of the direction $\theta_k$ and of the amplitude $I_k$ are called "intermediate measurements". Hereinafter, it is considered that the difference between the instant $t_p$ at which the new measurements are acquired and recorded in the memory 44 and the instant $t_k$ at which the algorithm 18 is executed by the calculator 14 is negligible. Henceforth, the instants $t_p$ and $t_k$ are considered to be equal and the notation "$t_k$" alone is also used to designate the instant at which a stride is detected.

Thus, the calculator 15 carries out a processing of the measurements of the physical quantities provided by the inertial platform 22 so as to generate measurements of the direction θk and of the amplitude Ik solely at the instants $t_k$. Only these intermediate measurements generated at the instants $t_k$ are thereafter recorded in the memory 44. Thus, in an advantageous manner, over a given time period, the number of intermediate measurements recorded in the memory 44 by the calculator 15 is lower, and preferably two or ten or a hundred or a thousand times lower, than the number of measurements that the calculator 15 receives from the inertial platform 22 over the same time period.

Therefore, during steps 104 and 108, the calculator 15 carries out a first compression of the measurements of the inertial platform 22.

During step 108, the calculator can also establish other additional physical quantities which are thereafter utilized by the algorithms 18 and 20 to increase the precision of location of the device 10. For example, the calculator 15 establishes the value of an indicator Manip($t_k$). The indicator Manip($t_k$) is equal to "1" if the device 10 has been moved with respect to the body of the pedestrian 4 at the instant $t_k$, and equal to "0" in the converse case. Accordingly, the reader may refer to the patent application filed under the number FR1363723 on Dec. 31, 2013 by the applicant and entitled "Procédé et dispositif de détection de manipulation d'un appareil portable" [Method and apparatus for detecting manipulation of a portable device].

Still during step 108, the calculator 15 also establishes a physical quantity P($t_k$) whose value is equal to the difference between the pressures measured at the instants $t_{k-1}$ and $t_k$.

Thereafter, during a step 110, the calculator 15 verifies whether the calculator 14 is in its active phase. In the affirmative, it makes the intermediate measurements carried out available to the calculator 14 and then it returns thereafter directly to step 102 without executing the following step 112. For example, the intermediate measurements prepared are recorded in the memory 44 and an interrupt signal is transmitted to the calculator 14 to indicate to it that it can recover the new intermediate measurements recorded in the memory 44. Thus, in its active phase, the number of intermediate measurements received and processed by the calculator 14 is equal to the number of instant $t_k$. In the negative, that is to say if the calculator 14 is in its unavailability phase, then, before returning to step 102, the calculator 15 undertakes step 112.

During step 112, the calculator 15 logs characteristics of the path traveled by the device 10 while the calculator 14 is in its unavailability phase. For example, during this step 112, at each instant $t_k$, the calculator 15 constructs the position $PA_k$ of the device 10 solely on the basis of the established direction $\theta_k$ and the established amplitude $I_k$ and of the last position $PA_{k-1}$ constructed. In this embodiment, it is this series of positions which constitutes the path logged by the calculator 15 during the unavailability phase of the calculator 14. The logged path is recorded in the memory 44.

During step 112, the calculator 15 seeks solely to log the path traveled by the device 10 and not to correct it. Indeed, the calculator 14 alone has access to the map 16 to correct the logged position of the device 10. Thus, during this step 112, the calculator 15 does not correct the positions constructed so as to avoid the accumulation of the measurement errors of the inertial platform 22. In particular, the calculator 15 does not use the map 16 or any other source of information storing constraints on the displacements of the pedestrian 4 in the building 2 so as to avoid the accumulation of such errors. The path logged when the calculator 14 is in its unavailability phase may therefore comprise significant errors. In particular, the measurement biases of the sensors of the inertial platform 22 accumulate as time elapses.

Here, during step 112, the calculator 15 undertakes an operation 114 of logging characteristic points of the path traveled during the unavailability phase. This operation 114 is aimed at limiting the volume of data recorded in the memory 44 during the unavailability phase. This operation 114 is also aimed at limiting the amount of information to be processed by the calculator 14, upon its return to the active phase, to obtain an estimation of the position of the device 10 on the basis of the measurements carried out during the unavailability phase. Accordingly, the calculator 15 identifies characteristic points in the path traveled by the device 10 and records these characteristic points in the memory 44. Moreover, for each pair of successive characteristic points along the path traveled by the device 10, the calculator 15 determines the coefficients of a polynomial which approximates the path of the device 10 between these two characteristic points. For example, here, this polynomial is a polynomial of degree one. Thus, the path of the device 10 between two immediately successive characteristic points is approximated by a rectilinear segment which directly joins these two characteristic points. The intermediate positions of the device 10, logged by the calculator 15, between two characteristic points are erased from the memory 44. To obtain fewer characteristic points than there are constructed positions $PA_k$, the characteristic points are, for example, the points of the path where the amplitude of the change of the direction of movement of the device 10 is greater than a predetermined threshold $S_\theta$. For example, a change of direction is identified when $|\theta_k - \text{Heading}| > S_\theta$, where Heading is the direction of movement of the device 10, obtained on the basis of the previous measurements. The threshold $S_\theta$ is for example greater than 50° or 80°. Here, the threshold $S_\theta$ is taken equal to 85°.

An exemplary possible procedure for determining these characteristic points where the direction of movement changes a lot, is described in detail in the Spassov2007 thesis in chapter 3.2.1. The description of this procedure is therefore not repeated here.

Moreover, in this embodiment, the calculator 15 adds other additional characteristic points to these characteristic points corresponding to significant changes in the direction of movement. These additional characteristic points do not necessarily correspond to a significant change of direction, but to a significant change in another physical quantity measured by the inertial platform 22. For example, the calculator 15 adds an additional characteristic point each time at least one of the following conditions is satisfied:

1) The distance $\Delta D$ traveled since the last identified characteristic point is greater than a predetermined threshold $S_D$,
2) The pressure difference $P(t_k)$ is greater than a predetermined threshold $S_P$,
3) The indicator $\text{Manip}(t_k)$ has just changed value, and
4) If the difference between $t_k - T$ is greater than a predetermined threshold $S_T$, where T is the instant at which the last characteristic point has been identified.

For example, the threshold $S_D$ is greater than or equal to 50 m or 100 m, and less than or equal to 500 m or 250 m. This threshold $S_D$ can be tailored as a function of the characteristics of the building 2. For example, if the building 2 comprises wide open spaces, the threshold $S_D$ will be larger than if the building 2 comprises only small rooms. Here, the threshold $S_D$ is taken equal to 100 m. The threshold $S_P$ is greater than 0.05 hPa and, generally, greater than 0.1 hPa. Here, the threshold Sp is taken equal to 0.1 hPa. The threshold $S_T$ is greater than 5 s or 10 s. Here, the threshold $S_T$ is equal to 100 s.

The position of each characteristic point and of each additional characteristic point is recorded, by the calculator 15, in the memory 44.

The aggregate of the number of characteristic points and of the number of additional characteristic points that are recorded in the memory 44 during the unavailability phase is strictly less than the number of intermediate measurements that the calculator 15 would have recorded in this same memory 44 for the same duration during the active phase. Thus, when the operation 114 is executed, in addition to carrying out a first compression of the measurements of the inertial platform 22, the calculator 15 carries out a second compression which reduces still more the amount of information recorded in the memory 44. Because of this second compression, during the unavailability phase, the number of characteristic points recorded in the memory 44 is strictly less than the number of instants tk which occur during this phase.

In parallel, immediately after the instant $t_0$, the calculator 14 gets ready to execute the algorithm 18 for the first time. There does not therefore exist any position previously estimated for the device 10 with the aid of this algorithm 18. Thus, the calculator 14 begins by executing a step 120 of initialization of the algorithm 18. Accordingly, the calculator 14 then generates an initial set of $N_0$ particles $S^i$. The number $N_0$ of particles $S^i$ depends in particular on the initial knowledge about the position of the device 10 in the building 2 and of the surface area of this building. Typically, $N_0$ is greater than 10 or 100. $N_0$ is also generally less than 5000 or 1000. Each particle $S^i$ is associated initially:

- with an initial position $P^i_0$ inside the building 2, this position $P^i_0$ comprising the coordinates $x^i_0$, $y^i_0$ and $z^i_0$ of the particle $S^i$ in the XYZ frame,
- with an initial value $w^i_0$ of the weight $w^i$ representing the probability that the device 10 is situated at the place of this particle $S^i$ at the instant $t_0$,
- with an initial value $\alpha^i_0$ for the corrective factor $\alpha^i$, and
- with an initial value $\varepsilon^i_0$ for the corrective factor $\alpha^i$.

During step 120, the initial position $P^i_0$ and the initial values $w^i_0$, $\alpha^i_0$ and $\varepsilon^i_0$ are initialized. Numerous procedures for initializing the positions $P^i_0$ and the values $w^i_0$ of each particle are known. For example, if the initial position of the device 10 is known to within plus or minus 1 m, the values $P^i_0$ of all the particles $S^i$ are randomly drawn inside a circle centered on the known position and of radius equal to 1 m. If the initial position of the device 10 is completely unknown, then the positions $P^i_0$ are, for example, uniformly distributed throughout the whole building 2. By way of illustration, each value $w^i_0$ is taken equal to $1/N_0$, where $N_0$ is the initial number of particles generated.

Each value $\alpha^i_0$ is randomly drawn in such a way that the distribution of the initial values $\alpha^i_0$ follows a predetermined probability law $Lp_{\alpha 0}$ such as a uniform or Gaussian or other distribution. The law $Lp_{\alpha 0}$ is generally not the same as the law $Lp_\alpha$ used to obtain the values of the random variable $\mu^i_\alpha$. It is the a priori knowledge about the distribution of the direction bias which makes it possible to choose the probability law for the initial values $\alpha^i_0$ which most resembles that observed in reality. For example, it is also this a priori knowledge about the distribution of the direction biases which makes it possible to fix the value of the standard deviation $\sigma_{\alpha 0}$ of the law $Lp_{\alpha 0}$. For example, the standard deviation $\sigma_{\alpha 0}$ is chosen equal to 360° if there is no information about the direction bias. In another example, the standard deviation $\sigma_{\alpha 0}$ is chosen less than 45° if there is a little information about the direction bias. In contradistinction to the case of the previous random variables, this probability law $Lp_{\alpha 0}$ does not necessarily have a zero mean.

Each initial value $\varepsilon^i_0$ is chosen as described previously for the initial values $\alpha^i_0$ except that a predefined probability law $Lp_{\varepsilon 0}$ for the stride bias is used instead of the law $Lp_{\alpha 0}$. Moreover, the probability law $Lp_{\varepsilon 0}$ is not necessarily identical to the law $Lp_{\alpha 0}$. Indeed, generally, the direction bias and stride bias are not correlated. Typically, the standard deviation $\sigma_{\varepsilon 0}$ of the law $Lp_{\varepsilon 0}$ is equal 30% to within plus or minus 5% if there is no information about the stride bias. In another example, the standard deviation $\sigma_{\epsilon 0}$ is chosen less than 20% if there is a little information about the stride bias.

Thereafter, the calculator 14 executes a phase 122 of location of the device 10 by executing the algorithm 18.

More precisely, during a step 124, the calculator 14 receives the direction $\theta_k$ and the amplitude $I_k$ that were previously established by the calculator 15 for the instant $t_k$. On the basis of these measurements, the calculator 14 calculates the speed $v_k$ of the current displacement of the device 10 since its last position. Thereafter, the calculator 14 estimates the new positions $P^i_k$ by executing the following steps.

During a step 126, each particle is moved in a manner correlated with the measured displacement of the device 10 from its previous position $P^i_{k-1}$ to a new position $P^i_k$. Accordingly, the coordinates of each particle $S^i$ are updated as a function:
- of the direction $\theta_k$ and amplitude $I_k$ received,
- of the coordinates of the previous position $P^i_{k-1}$ of this particle, and
- of the displacement law used.

At each new execution of step 126, the new values for the variables $\mu^i_x$, $\mu^i_y$, $\mu^i_\alpha$ and $\mu^i_\epsilon$ are randomly drawn with the aid of the laws, respectively, $Lp_{xy}$, $Lp_\alpha$ and $Lp_\epsilon$.

During a step 128, the calculator 14 updates the weights $w^i$ of each particle $S^i$. More precisely, the calculator 14 decreases the weight $w^i$ of the particle $S^i$ if its last displacement from the position $P^i_{k-1}$ to the position $P^i_k$ has infringed predefined constraints associated with the map 16.

Typically, in this exemplary embodiment, for each particle $S^i$, the calculator 14 verifies the following constraint:
constraint 1): the segment $[P^i_{k-1}; P^i_k]$ must not cross an impenetrable obstacle of the map 16.

Generally, here a constraint on the displacement of the particle $S^i$ is defined as being a condition which, if it is satisfied by the particle $S^i$, is used to increase the weight $w^i$ of this particle $S^i$ with respect to the weight of the particles which do not satisfy this condition. Conversely, if this condition is not satisfied by the particle $S^i$, then it is used to decrease the weight $w^i$ of this particle $S^i$ with respect to the weights of the particles which satisfy this condition.

To evaluate the constraint 1), for each particle $S^i$, the calculator 14 searches for whether an intersection exists between the segment $[P^i_{k-1}; P^i_k]$ and each impenetrable obstacle of the map 16. Here, since each obstacle is coded by a segment, this intersection search amounts to searching for an intersection between two segments.

If an intersection exists, then a very low or zero value is assigned to the weight $w^i$. A very low value is a value of less than 0.2 or 0.1 for example. In the converse case, the value of the weight $w^i$ remains unchanged.

During a step 130, the calculator 14 undertakes the normalization of the weights $w^i$ of all the particles $S^i$ so that the sum of all these weights is equal to one. For example, the calculator 14 calculates the sum W of all the weights $w^i$ and then divides each weight $w^i$ by the sum W.

During a step 132, the calculator 14 resamples the particles $S^i$. This resampling step consists in deleting the particles whose weights $w^i$ have become too low so as to replace them with particles associated with parameters whose weights are higher.

Numerous resampling techniques are known. For example, here, the SIR (Sequential Importance Resampling) procedure is applied, described in the following book: B. Ristic, S. Arulampalam, N. Gordon, "Beyond the Kalman Filter, particle filter for tracking applications", Artech House, 2004.

To summarize, this resampling procedure consists firstly in classing the particles into two groups: the particles to be regenerated, that is to say all the particles whose weight is less than a predetermined threshold, and the surviving particles, that is to say the other particles.

Thereafter, for each particle to be regenerated, the calculator 14 deletes the old particle and then generates a new particle to replace it. To generate a new particle, the calculator 14 randomly draws a particle from the group of the surviving particles. This random drawing is carried out preferably in such a way that the probability of being drawn is proportional to the weight of the surviving particle.

Thereafter, the position $P^i_k$ and the values $\alpha^i_k$ and $\epsilon^i_k$ of the drawn surviving particle are assigned to the new particle generated. During this step, preferably, the calculator adds a random disturbance in the position and in the values of the corrective factors by using, for example, the random variables $\mu_x$, $\mu_y$, $\mu_\alpha$ and $\mu_\epsilon$. However, these disturbances are calibrated in such a way that the values $\alpha^i_k$ and $\epsilon^i_k$ assigned to the particle generated remain very close to the current values of the corrective factors associated with the surviving particle drawn. Typically, the mean of the values $\alpha^i_k$ that are assigned to the generated particles is closer to the mean of the values $\alpha^i_k$ of the surviving particles than to the mean of the values $\alpha^i_k$ of the deleted particles. The same holds for the values $\epsilon^i_k$ assigned to the generated particles.

A new weight is also assigned to each generated particle and, optionally, to the surviving particle from which it arises.

After the resampling, during a step 134, for each surviving particle $S^i$, the calculator 14 records in the memory 12 the position $P^i_k$, the values $\alpha^i_k$ and $\epsilon^i_k$ and its weight $w^i$.

Thereafter, during a step 136, the calculator 14 estimates the position $PA_k$ of the device 10 on the basis of the positions $P^i_k$ and of the weights $w^i$ of all the particles $S^i$. Numerous procedures for doing this are possible. For example, the position $PA_k$ is taken equal to that of the particle $S^i$ having the highest weight $w^i$. In another embodiment, the position $PA_k$ is taken equal to the mean of the positions $P^i_k$ of the particles $S^i$ by weighting each position $P^i_k$ by the weight $w^i$. Another procedure is also described in application WO2012158441.

Finally, during a step 138, a dot is displayed at the position $PA_k$ on the graphical representation 30 of the map 16 to indicate to the pedestrian 4 their position on this map and therefore their position inside the building 2.

Steps 124 to 138 are repeated in a loop as long as the calculator 14 remains in its active phase. As these iterations proceed, the deterioration of the precision of estimation of the position of the device 10 is limited to the maximum since only the most probable positions $P^i_k$ are preserved during the resampling step 132.

Moreover, since the values of the corrective factors $\alpha^i$ and $\epsilon^i$ converge toward the actual values of the direction bias and stride bias as the iterations of steps 124 to 138 proceed, the corrective factors correct this direction bias and this stride bias more and more precisely. Henceforth, the presence of these corrective factors in the displacement law makes it possible to substantially increase the precision of estimation of the position $PA_k$ even in the presence of such direction bias and stride bias.

At an instant $t_1$, the calculator 14 toggles, for example automatically, to its unavailability phase. For example, this toggling to the unavailability phase is brought about by the absence of interaction between the pedestrian 4 and the device 10 for a duration greater than a predetermined threshold. The execution of the algorithm 18 is therefore interrupted. When the calculator 14 toggles to its unavailability phase, for example, it informs the calculator 15 thereof. Here, this toggling of the calculator 14 to its unavailability phase makes it possible to save energy and therefore to limit the discharging of the battery of the device 10. Hereinafter, the last positions $P^i_k$, the last values $w^i_k$ of the weights $w^i$ and the last values $\alpha^i_k$ and $\epsilon^i_k$ recorded for each particle $S^i$ just before the instant $t_1$, are denoted, respectively, $P^i_{t1}$, $w^i_{t1}$ and $\alpha^i_{t1}$ and $\epsilon^i_{t1}$.

During the unavailability phase, the calculator 15 continues to execute steps 102 to 108 and moreover executes step 112. Typically, the unavailability phase lasts several intervals $\Delta t$. For example, it lasts at least one 1 s and often more than 1 min or 5 min.

At an instant $t_2$, the calculator 14 becomes re-available to execute any one of the algorithms 18 and 20. The unavailability phase is therefore interrupted at this instant. For example, the stopping of the unavailability phase is brought about by an interaction of the pedestrian 4 with the man-machine interface of the device 10. At this instant, the algorithm 18 must again be initialized, since between the instants $t_1$ and $t_2$, the device 10 may have been moved inside the building 2. Accordingly, the calculator 14 firstly executes an active-wakeup phase 148. In the particular case described here, this phase 148 is aimed at initializing for each particle $S^i$ its position $P^i_{t2}$, its weight $w^i_{t2}$ and the initial values $\alpha^i_{t2}$ and $\epsilon^i_{t2}$ of the corrective factors $\alpha^i$ and $\epsilon^i$ by using the data recorded by the calculator 15 during the unavailability phase. Hereinafter, to simplify the description, it is assumed here that the parameters $w^i_{t2}$, $\alpha^i_{t2}$ and $\epsilon^i_{t2}$ are taken equal, respectively, to the parameters $w^i_{t1}$, $\alpha^i_{t1}$ and $\epsilon^i_{t1}$.

To determine the value of the position $P^i_{t2}$ at the instant $t_2$, the calculator 14 executes, between the instants $t_2$ and $t_2+\Delta t_2$, the algorithm 20.

In this embodiment, to correct the path logged between the instants $t_1$ and $t_2$, the algorithm 20 uses a graph 150 (FIG. 5) prerecorded in the memory 12. The graph 150 codes all the possible paths inside the building 2. To simplify FIG. 5, only a part of the graph 150 coding the possible paths inside a single room 152 has been represented. This room 152 is delimited by walls 154 to 157 and also comprises, in the interior, two impenetrable obstacles 160 and 162.

In the graph 150, each possible path comprises a succession of successive nodes $N_m$ joined to one another by rectilinear segments $A_j$. Hereinafter, the first node and the last node of a possible path are called, respectively "starting node" and "finishing node" of the path. Similarly, for each segment $A_j$, which extends between two nodes, the node closest to the starting node along the path is called the "upstream node". While the node furthest from this starting node is called the "downstream node". Each node is situated at a position $P_{Nm}$ which can be occupied by the device 10. The position $P_{Nm}$ of each node $N_m$ is expressed in the XYZ frame. Each position $P_{Nm}$ is known. For example, here, these positions $P_{Nm}$ are chosen so that the distance between two immediately consecutive nodes in a possible path is always equal to a constant D. Here, this constant D is equal to 1 m. The segments $A_j$ never cross an impenetrable obstacle. Thus, the existence of a segment between two nodes indicates that the device 10 can pass freely from one of these nodes to the other. Each segment $A_j$ is associated with a weight $w_{Aj}$. For example, the weight $w_{Aj}$ indicates the length of the segment $A_j$. In this example, the weights $w_{Aj}$ are all equal.

Figure 5:
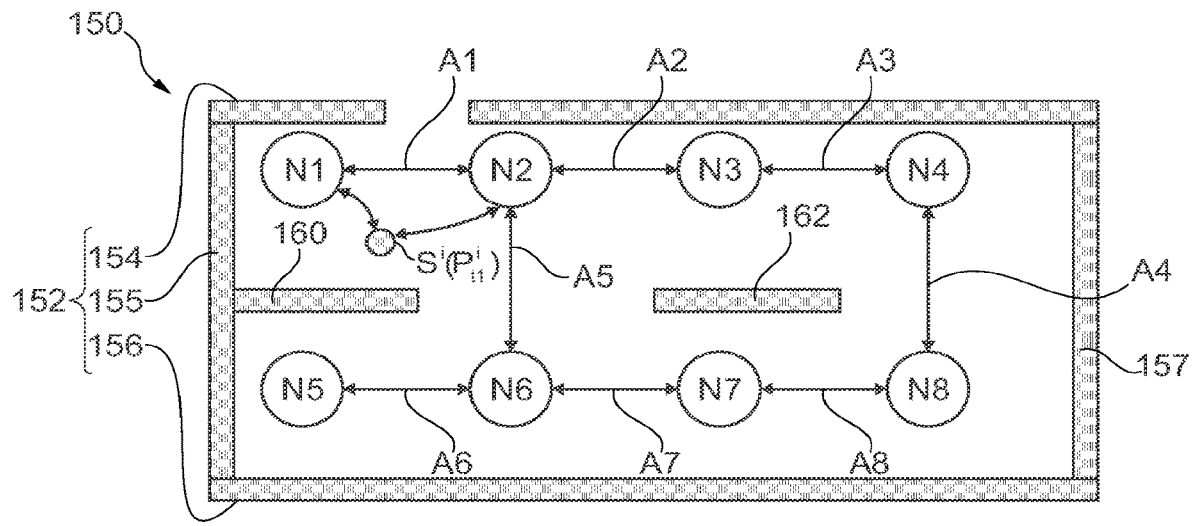
FIG. 5 is a schematic illustration of an exemplary graph, used by the device of FIG. 2A, of the possible paths.

In FIG. 5, only eight nodes N1 to N8 have been represented, joined to one another by eight segments A1 to A8.

The algorithm 20 comprises the following steps for obtaining an initial position $P^i_{t2}$ associated with the weight $w^i_{t2}$ and with the values $\alpha^i_{t2}$ and $\epsilon^i_{t2}$.

Optionally, during a step 198, the calculator 14 selects a limited number M of particles from among the particles $S^i$ and applies the following steps solely to the selected particles $S^i$. For example, the calculator 14 selects solely the particles $S^i$ whose weight $w^i_{t1}$ is greater than a predetermined threshold $S_w$.

Figures 6, 7:
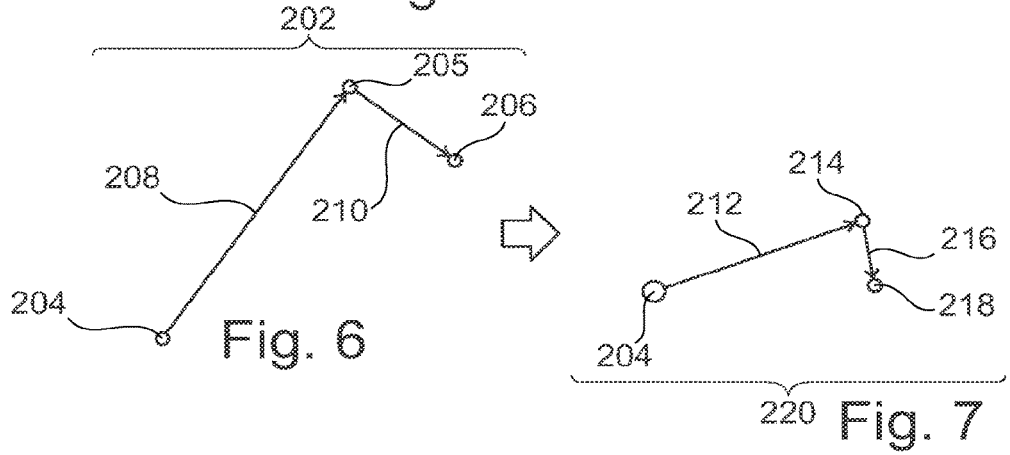
FIGS. 6 and 7 are examples of paths, respectively, logged and corrected by the device of FIG. 2A.

Thereafter, during a step 200, the calculator 14 corrects the path, logged during the unavailability phase and then extracted from the memory 44, with the aid of the corrective factors $\alpha^i$ and $\epsilon^i$ associated with the particle $S^i$. This step is now described in the particular case of the path represented in FIG. 6. FIG. 6 represents a simplified example of a logged path 202 comprising only three characteristic points 204 to 206. The points 204 and 206 are, respectively, the starting and finishing points of the path 202. The points 204 and 205 are connected to one another by a segment 208, and the points 205 and 206 are connected by a segment 210. The direction of travel along the path 202 is represented by arrows in FIG. 6.

To begin, the calculator 14 corrects the length of the segment 208 by multiplying it by $(1+\epsilon^i_{t1})$. Account is thus taken of the stride bias estimated for this particle $S^i$ during phase 122. Thereafter, the calculator 14 rotates the segment 208 by an angle $\alpha^i_{t1}$ about a vertical axis passing through the point 204. Thus, the calculator 14 corrects the direction bias estimated for this same particle $S^i$ during phase 122.

The corrected segment thus obtained bears the reference 212 in FIG. 7. The corrected segment 212 points from the point 204 to a new characteristic point 214. The point 214 is identical to the point 205, except that its position has been corrected with the aid of the corrective factors $\epsilon^i_{t1}$ and $\alpha^i_{t1}$.

The same processing is thereafter applied to the following segment 210. The corrected segment 216 of FIG. 7 is thus obtained. This segment 216 points from the corrected characteristic point 214 to a new characteristic point 218. The point 218 is identical to the point 206, except that its position has been corrected with the aid of the values $\alpha^i_{t1}$ and $\epsilon^i_{t1}$. The points 206, 214 and 218 and the segments 212 and 216 form a corrected path 220. During the following step, it is this path 220 which is used, rather than the uncorrected path 202.

It will be noted that depending on the particle $S^i$ processed, the corrected path obtained is not necessarily the same, since the values $\alpha^i_{t1}$ and $\epsilon^i_{t1}$ may be different from particle to particle.

Thereafter, during a step 228, the calculator 14 again corrects the logged path, but this time on the basis of the impenetrable obstacles associated with the map 16. Accordingly, it undertakes the following operations.

The position $P^i_{t1}$ does not generally coincide exactly with the position $P_{Nm}$ of a node of the graph 150. Thus, during an operation 230, the calculator 14 associates the particle $S^i$ with one or more closest nodes of the graph 150. This step is illustrated with the aid of FIG. 5. Represented in FIG. 5, in addition to the graph 150, is the position $P^i_{t1}$ of the particle $S^i$. The position $P^i_{t1}$ does not coincide with any of the positions $P_{Nm}$ of the nodes of the graph 150. The calculator 14 then associates the particle $S^i$ with only the nodes closest to the position $P^i_{t1}$. Here, if several nodes lie less than X meters from the position $P^i_{t1}$, each of these nodes is associated with the particle $S^i$. For example, the distance X is constant and less than 2 in or than 1 m. Here, the distance X is taken equal to 1 m. In the case where no node lies less than X meters from the position $P^i_{t1}$, the particle $S^i$ is associated with the closest nodes. In the example represented in FIG. 5, the particle $S^i$ is associated with the nodes N1 and N2 since it is less than a meter from these two nodes.

During an operation 232, the calculator 14 assigns a weight to each node associated with the particle $S^i$. Here, the sum of the weights assigned to the nodes associated with the same particle $S^i$ is equal to the weight $w^i_{t1}$. Moreover, preferably, the weight assigned to each node is dependent on the distance which separates it from the position $P^i_{t1}$. Here, the weights $w^i_{N1}$ and $w^i_{N2}$, respectively of the nodes N1 and N2, are taken equal, respectively, to $(d_1 * w^i_{t1})/(d_1 + d_2)$ and $(d_2 * w^i_{t1})/(d_1 + d_2)$, where $d_1$ and $d_2$ are the distances which separate the position $P^i_{t1}$, respectively, from the positions of the nodes N1 and N2.

During an operation 234, for each node associated with the particle $S^i$, the calculator 14 identifies the most probable downstream node or nodes. This step is illustrated with the aid of FIG. 8. This step will now be described in the particular case of the node N1 and of the segment 212, given that what is described in this particular case applies identically to the other nodes associated with the particle $S^i$.

Figure 8:
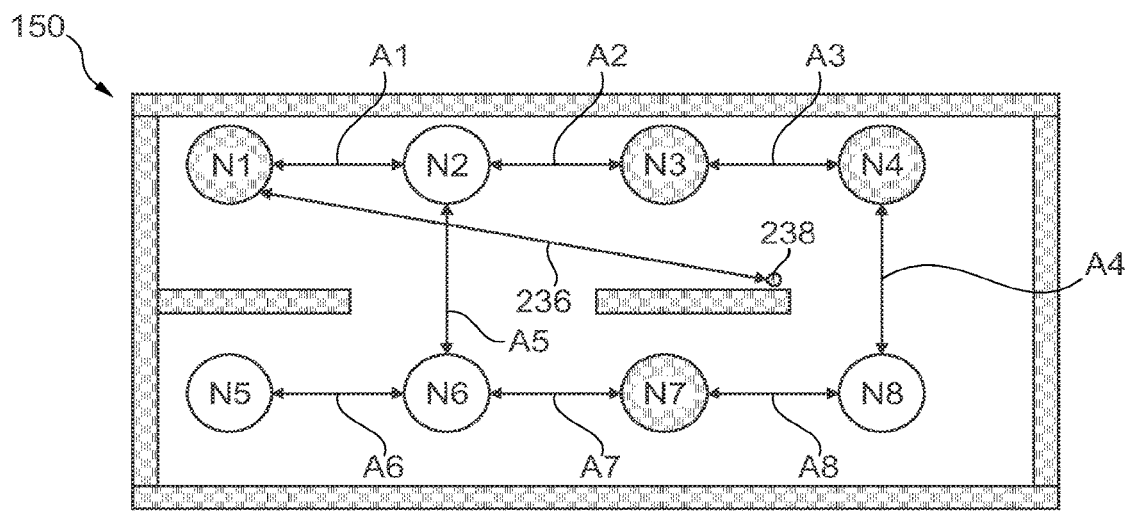
FIG. 8 is a schematic illustration of a step of correcting a path logged with the aid of the graph of FIG. 5.

The segment 212 is moved so that its upstream point coincides with the position $P_{N1}$. A segment 236, represented in FIG. 8, is thus obtained. The downstream point of the segment 236 bears the reference 238 and occupies a position $P_{238}$. The calculator 14 associates the point 238 with the closest node(s). For example, it proceeds in an identical manner to what was described during the operation 230. Here, this leads to associating the point 238 with the nodes N3, N4 and N7. It is considered here that the node N8 is more than 1 m from the position $P_{238}$. By associating several downstream nodes with the same upstream node, several hypothetical routes that might have been followed by the device 10 are defined. For example, in the case illustrated here:

the node N3 corresponds to a first hypothetical route equal to the union of segments A1 and A2,
the node N4 corresponds to a second hypothetical route equal to the union of segments A1, A2 and A3, and
the node N7 corresponds to a third hypothetical route equal to the union of segments A1, A5 and A7.

Here, to simplify, the calculator 14 selects solely the most direct hypothetical route between the upstream and downstream nodes.

During an operation 240, the calculator 14 assigns a weight to each downstream node. For example, the calculator 14 proceeds as described during the operation 232, except that the sum of the weights of the downstream nodes is equal to the weight of the upstream node. Thus, the sum of the weights assigned to the nodes N3, N4 and N7 is equal to the weight of the node N1. The same is also undertaken for the downstream nodes obtained by selecting the node N2 as being the upstream node of the segment 212.

Thereafter, the operations 234 and 240 are repeated by taking as upstream node each of the downstream nodes identified during the previous execution of the operation 234 and by using the following segment 216 of the corrected path instead of the preceding segment 212.

The operations 234 and 240 are repeated until the totality of the segments of the corrected path has been used successively and in the order in which they were logged during the unavailability phase.

Once the repetition of the operations 234 to 240 has terminated, there are generally several hypothetical routes that might have been followed by the device 10 on starting from the position $P^i_{t1}$. During an operation 250, the calculator 14 then selects the most probable hypothetical route. In the case described here, the most probable route is that whose finishing node is associated with the highest weight. This selected route is then the new corrected path obtained on completion of step 228.

Finally, during a step 252, the calculator 14 constructs the initial position $P^i_{t2}$ of the particle $S^i$ on the basis of its position $P^i_{t1}$ and of the corrected path obtained on completion of step 228. For example, the calculator moves the particle $S^i$ by following the corrected path from the position $P^i_{t1}$ to its finishing point. In doing this, the calculator 14 estimates several values $P^i_w$ of the position of the particle $S^i$ at instants $t_w$ included in the interval $]t_1; t_2]$. Here, each values $P^i_w$ corresponds to a characteristic point of the new corrected path. The initial position $P^i_{t2}$ is taken equal to the coordinates, in the XYZ frame, of the finishing point.

It is noted that by proceeding in this way, the diversity of the positions $P^i_{t1}$ is preserved. Indeed, it is very improbable that two particles having different positions $P^i_{t1}$ make it possible to obtain identical initial positions $P^i_{t2}$.

Steps 200 to 252 are applied to each of the particles selected during step 198.

Moreover, before phase 148 is completed, the calculator 14 can also estimate the positions $PA_w$ of the device 10 at each instant $t_w$ included in the interval $]t_1; t_2[$ on the basis of the positions $P^i_w$ estimated for all the particles $S^i$. Accordingly, for example, it can proceed in the same manner as during step 136. In this case, the weight $w^i_w$ associated with each position $P^i_w$ is taken equal to the weight associated with the particle $S^i$. For example, it is the weight $w^i_{t1}$ or $w^i_{t2}$. In another simplified embodiment, all the weights $w^i_w$ are taken equal. The positions $PA_w$ of the device 10 are, for example, thereafter displayed on the screen 28 of the device 10 thereby making it possible to show the path traveled by this device even during the unavailability phase.

At the instant $t_2 + \Delta t_2$, the execution of the algorithm 20 is terminated and phase 148 terminates. The calculator 14 now has initial positions $P^i_{t2}$ for each selected particle. If the number of selected particles is insufficient, then the calculator 14 can execute the resampling step on the selected particles to increase their number. This resampling step is for example identical to step 132.

Thereafter, the method returns to the active phase 122. Accordingly, the calculator 14 returns to step 124 and uses as previous positions $P^i_{k-1}$ the positions $P^i_{t2}$ obtained on completion of phase 148.

Phase 148 is executed each time the calculator 14 toggles from its unavailability phase to its active phase.

Figure 9:
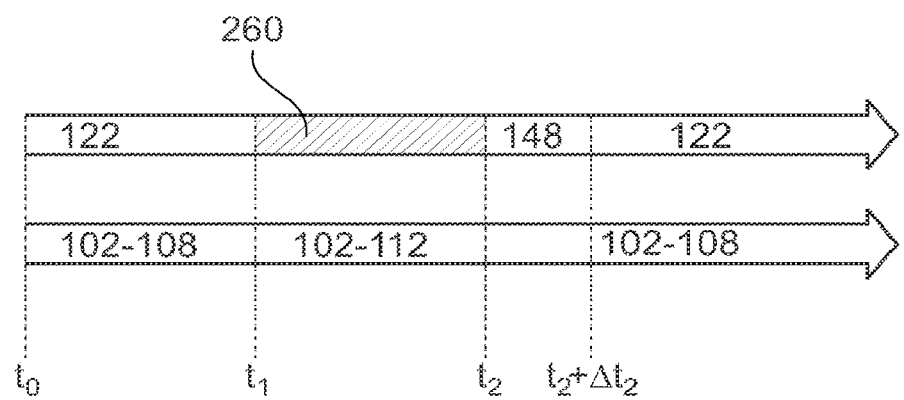
FIG. 9 is a timechart of various operating phases of various calculators used in the device of FIG. 2A.

FIG. 9 represents the scheduling over time of the operation of the calculators 14 and 15 during the execution of the method of FIG. 4. More precisely, in this figure, the top and bottom arrows represent the operating phases, respectively, of the calculators 14 and 15.

Between the instants $t_0$ and $t_1$ and then after the instant $t_2$, the calculator 14 is in its active phase. Conversely, between the instants $t_1$ and $t_2$, the calculator 14 is in its unavailability phase. The unavailability phase is represented by a hatched zone 260. In this figure, inside each of the arrows, the numerical references of the steps executed by, respectively, the calculators 14 and 15 are indicated in the time interval where they are executed. The notation "102-108" and "102-112" signifies that one is dealing, respectively, with steps 102 to 108 and with steps 102 to 112.

Different variants of the main embodiment will now be described.

Variants on the Structure of the Device 10:

The memory 12 may be an assembly of several distinct physical memories.

In a variant, the device 10 comprises additional sensors capable of delivering additional information about the position of the device 10. For example, the device 10 can comprise a GPS sensor which delivers an absolute position of the device 10. It can also comprise a sensor capable of measuring the absolute position of this device 10 with respect to immovable stations fixed without any degree of freedom inside the building 2. These stations are for example Wi-fi emitters-receivers. In this case, the sensor measures the power of the waves emitted by these stations and calculates its position with respect to these stations, for example, by triangulation. Thereafter, this position with respect to the stations is converted into a position of the device 10 in the map 16 on the basis of the knowledge of the position of these stations inside the building 2. In this case, the algorithm 18 and/or the algorithm 20 can, in addition to the measurements of the inertial platform 22, use measurements of these additional sensors to estimate the position $PA_k$. For example, if an approximate measurement of the position of the device 10 is available by using other information, then the weight $w^i$ is increased if the position $P^i_k$ is close to this approximate position and, on the contrary, decreased if the position $P^i_k$ is far from this approximate position.

In another embodiment, the inertial platform comprises more sophisticated sensors which provide a mean value of the variable measured at an instant k as well as a standard deviation in this measurement (see for example Straub2010). In this case, the measured values of the angle $\theta_k$ and of the amplitude $I_k$ are obtained by randomly drawing the values by using a Gaussian probability law whose mean and standard deviation are equal to those transmitted by the sensors. This makes it possible in particular to take the measurement noise into account.

The inertial platform can also comprise additional sensors such as a gyroscope, a barometer, a hydrometer, a thermometer, a microphone, a proximity sensor or a luminous intensity sensor or other sensors.

The device 10 can take the form of any device that can be moved in the space by a user and whose relative position can be measured. Preferably, the device 10 is a transportable device that can be carried, directly in the hand, by the user. It may be, in addition to the examples given previously, a wired telephone, a personal digital assistant, better known by the acronym "PDA", a games console, a navigation apparatus, an apparatus, such as those incorporated in an intelligent bracelet, for tracking the user's activity or fitness, an intelligent watch, and any other portable electronic device that can be carried or worn by the user. For example, it may also be a mobile Internet access device known by the acronym MID (Mobile Internet Device), a personal navigation apparatus known by the acronym PND (Personal Navigation Device), a digital photographic device, a video camera, binoculars, a long-focal-length objective (or "telephoto lens"), a portable multimedia device for playing music or videos or for listening to the radio, a remote control or a combination of the above-cited devices.

The device 10 may be an autonomous device or, on the contrary, operate solely in combination with another device, portable or not. For example, the other device is a laptop or office computer, a computer server or the like. The other device then communicates with the device 10 by way of a wired or wireless network. If a wired communication is used, the latter can be of any type such as a serial link, a parallel link, a transmission by parquets, etc. Similarly, if a wireless link is used, the latter can be of any type such as a wireless transmission via electromagnetic waves or infrared waves or other waves. It may also be a link implementing a combination of wired and wireless technologies.

As a variant, the calculator 14 is not more powerful than the calculator 15. In another variant, the calculators 14 and 15 are integrated inside one and the same electronic component, or indeed even on one and the same silicon substrate. The calculator 14 can take the form of a grouping of several distinct microprocessors. In the latter case, one of these distinct microprocessors is used to execute the algorithm 18 and another to execute the algorithm 20.

The calculator 15 is not necessarily integrated inside the MPU 40. As a variant, the calculator 15 is a calculator external to the MPU 40 and linked up by an external bus to the MPU 40. For example, the calculator 15 can be integrated into a sensor such as the inertial platform 22. In the latter case, when the sensor comprises the calculator 15 one often speaks of a "smart sensor". In another variant, the calculator 15 is composed of several microprocessors. In the latter case, one of these microprocessors can be integrated into the MPU 40 to process the measurements of the platform 22 and record them in the memory 44 while another microprocessor, external to the MPU 40, carries out the remainder of the operations such as the operation 114.

In another embodiment, the algorithm 20 is executed by a remote server and not by the unit 11. In this case, the unit 11 is linked up to this remote server by way of a wireless network, and transmits the path logged during the unavailability phase to this remote server. In response, the remote server executes the algorithm 20 and then returns the positions $P^i_{t2}$ to the device 10. This architecture is beneficial if the remote server executes the algorithm 20 faster than does the calculator 14.

In another variant, the calculator 15 also toggles between an active phase and an unavailability phase. In the active phase, the calculator 15 acquires the measurements of the inertial platform 22 and processes them as described previously. In the unavailability phase, it does not acquire any measurement of the inertial platform 22, and therefore does not carry out the processing operations described previously. On the other hand, even in this case, the calculator 15 remains in its active phase, as long as the device 10 has to be located and, in particular, during the unavailability phases of the calculator 14. For example, the calculator 15 toggles to its unavailability phase solely when no location application in respect of the device 10 is undergoing execution by the calculator 14. The calculator 15 can also toggled automatically to its unavailability phase as soon as the sensors of the inertial platform 22 are switched off.

Variants of Steps 102 to 112:

As a variant, the instants $t_k$ do not correspond to the instants at which the user plants a foot on the ground. For example, the instants $t_k$ are instants separated from one another by a predetermined period. In this case, the detection of the strides during step 104 can be omitted.

In another variant, the strides are detected on the basis of the measurements of one or more other sensors such as, for example, the measurements of the gyrometer.

During step 108 other additional intermediate measurements are established and then utilized subsequently to increase the precision of the location. For example the calculator 15 identifies a change of speed while moving in a straight line or a treading of the user. In a simplified variant, step 108 is omitted.

Steps 108 and 110 may be executed, at least partly, in parallel.

During the operation 114, the addition of additional characteristic points may be omitted. This operation 114 can also be simplified by using fewer conditions than those previously described to add additional characteristic points. For example, just one or two of these conditions chosen from among all the conditions previously described are used. As well as the additional characteristic points already cited, others may be added by using for this purpose the measurements of any type of sensor onboard the device 10. For example, an additional characteristic point is added as soon as the variation of the magnetic field direction measured by the magnetometer 26 crosses a predetermined threshold. In another example, an additional characteristic point is recorded each time a change of story is detected. This change of story is detected, for example, on the basis of the vertical acceleration and of the barometer of the inertial platform 22 and not on the basis of a simple change of the direction of movement.

Other procedures are possible for detecting a characteristic point where a significant change of direction occurs. For example, a significant change of direction can be detected by the fact that the angular velocity, measured by a gyrometer of the device 10, exceeds a predetermined threshold. A change of direction can also be detected on the basis of a variation in the direction of the magnetic field measured by a magnetometer of the device 10.

The path between two characteristic points can also be approximated by a polynomial of degree strictly greater than one, such as by a Spline, rather than by a rectilinear segment. For example, the path between two successive characteristic points is approximated by a polynomial of degree greater than or equal to two, three or more. It will be noted that the case of a polynomial of degree one corresponds to the embodiment described previously. The degree of the polynomial can be fixed once and for all or, on the contrary, chosen dynamically to minimize an approximation error. For example, the degree of the polynomial used to approximate the path logged between two successive characteristic points is chosen so that the approximation error is less than a predetermined threshold. The approximation error between the polynomial and the logged path is for example calculated as a quadratic error. In this case, the degree of the polynomial used between two given characteristic points is not necessarily the same as that used between two other characteristic points. The polynomial which approximates the path logged between two successive characteristic points can be recorded in the memory 44 by recording its coefficients or several of the points that it interpolates.

As a variant, the operation 114 is replaced with another known procedure for extracting characteristics in a signal logged between the instants $t_1$ and $t_2$. In another variant, the logged path is not compressed and the operation 114 is omitted.

The compressed path generated by the operation 114 is recorded in the memory 44 in addition to the non-compressed path logged during step 112 or, on the contrary, replaces in the memory 44 the logged non-compressed path. In the latter case, the logged non-compressed path is erased from the memory 44 at the time when the compressed path is recorded in this memory.

If the compressed path occupies too much room in the memory 44, provision may be made for the calculator 15 to wake up the calculator 14 so that it toggles to its active phase and processes the data recorded in the memory 44. Thereafter, the calculator 14 returns automatically to its unavailability phase and the data processed by the calculator 14 are erased from the memory 44. Thus, memory space is released for recording the rest of the logged path and/or of the compressed path.

In another variant, step 112 is implemented continuously, rather than only when the calculator 14 is in its unavailability phase. In a particular embodiment of this variant, the logging of the path is implemented systematically, but the operation 114 is executed only if the calculator 14 is in its unavailability phase.

The main embodiment has been described in the particular case where, during the unavailability phase, the calculator 15 implements a first compression algorithm to obtain the intermediate measurements and then implements, on these intermediate measurements, a second compression algorithm to obtain the characteristics recorded in the memory 44. Numerous other compression algorithms are usable either instead of the first algorithm or of the second algorithm. In particular, it is not necessary that the second compression algorithm identify characteristic points of the path logged during the unavailability phase. For example, it is possible to use as first or second algorithm, lossless compression algorithms or those entailing loss known as gzip (GNU zip), the file format rar, the file format arc, ADPCM (Adaptive Differential Pulse Code Modulation), fractal compression, etc. In this case, during the active phase or during the active-wakeup phase, the information thus compressed is decompressed before being processed by the algorithms 18 and 20. In the case of a second known compression algorithm, the characteristics logged are, for example, the redundant characteristics which appear as several copies in the measurements acquired and a single copy of which is preserved after compression.

As a variant, the second compression algorithm logs the characteristics to be recorded directly on the basis of the acquired measurements of the sensors without passing by way of the intermediate measurements. For example, in this case, the first and second algorithms are the same except that the compression rate is lower when this algorithm is used as first algorithm than when it is used as second algorithm. The first and second algorithms may also be different. In the latter case, for example, the first algorithm exhibits a smaller compression rate than that of the second algorithm.

Variants of Step 120 and of the Active Phase 122:

Step 120 of initialization of the algorithm 18 can be carried out differently. For example, the initial position of the device 10 in the building 2 is initialized by taking account of the last absolute position measured with the aid of a GPS or on the basis of Wifi stations.

The algorithm 18 can be an algorithm other than a particle filter. For example, the algorithm 18 can be a Kalman filter used to estimate the position either of each particle, or directly of the device 10. The algorithm 18 can also be replaced with an IMM (Interactive Multiple Models) algorithm.

In the case where the algorithm 18 is a particle filter, other displacement models are possible. For example, the distance traveled between two positions $P^i_{k-1}$ and $P^i_k$ can be obtained by integrating the measured acceleration to obtain the speed of movement between these two positions, and then by integrating this speed between the instants $t_{k-1}$ and $t_k$. Other ways of implementing the particle filter also exist. For example, it will be possible to refer in this regard to the thesis Straub2010 or to applications WO 2012158441 and U.S. Pat. No. 8,548,738.

Constraints on the displacements of the device 10 other than those described previously may be used. For example, these other constraints are identical to those described in application FR1455575. These other constraints are either usable during phase 122 or during step 228 to correct the logged path. For example, as a variant, the map 16 does not code the position of the walls inside the building 2. Instead of this or in addition, the map 16 contains:
- a mapping of the power of the Wifi waves measurable in various zones of the building 2,
- a mapping of the frequenting measured in various zones of the building 2,
- a mapping of the sound levels or of the sound ambiences present in various zones of the building 2,
- a mapping of the amplitude of the magnetic fields measurable in various zones of the building 2.

Such maps are usable as described previously in the particular case of the map 16. For example, the device 10 measures the power of the Wifi waves or the frequenting or the sound levels or the sound ambience or the amplitude of the magnetic field before and after having been moved by one stride. If in accordance with these measurements this displacement has caused the device 10 to pass from one zone of the map to another, then the weight associated with all the particles $S^i$ for which the positions $P^i_{k-1}$ and $P^i_k$ have remained in the same zone is decreased. Conversely the weight of the particles $S^i$, for which the positions $P^i_{k-1}$ and $P^i_k$ are situated in different zones of the map that are liable to correspond to the displacement measured by the device 10, is either increased or left unchanged.

During step 124, the calculator 14 may receive additional data relating to the displacement of the device 10 for calculating the displacement of each particle $S^i$. For example, the calculator 14 may receive several angles useful for determining the direction $\theta_k$ such as:
- an angle of orientation of the device 10,
- an angle of correction between the orientation of the device 10 and the direction of walking, better known by the term "Misalignement angle", or
- an angle, measured with the aid of the magnetometer, between a frame in which the logged path is calculated and a reference frame.

During step 124, the displacement can also be given in the form of a speed $v_x$, $v_y$, or in the form of position increments $\Delta x$, $\Delta y$.

Additional information can be transmitted to the calculator 14 during this step 124, such as an indicator of change of position of the device 10, a treading indicator, the atmospheric pressure, etc.

During step 126, the laws $Lp_{xy}$, $Lp_\alpha$ and $Lp_\varepsilon$ can be modified as a function of the additional information transmitted by the calculator 15 during step 124. For example, if a change of position of the device 10 is detected, the dispersion of the law $Lp_\alpha$ is increased.

Other resampling procedures can be implemented during step 132. For example, all the particles $S^i$ are resampled during this step rather than only some. During the resampling of the particles, numerous other algorithms for determining the initial position of the regenerated particles are known and can be used instead of that described previously. For example, the KLD (Kullbak-Leibler-Divergence) algorithm can be used. The resampling step can also be omitted.

Variants on the Switching Between Phases 122 and 148:

As a variant, it is the calculator 14 which indicates to the calculator 15 that it will switch to its unavailability phase. In this case, the calculator 15 does not need to interrogate the calculator 14 to determine whether or not it is in its unavailability phase.

Causes other than placement on standby can bring about the interruption of the execution of the algorithm 18 by the calculator 14 and the switch to the unavailability phase. Whatever the cause which brings about the momentary interruption of the execution of the algorithm 18 by the calculator 14, this cause can be dealt with as described hereinabove. Thus, when this cause disappears and the calculator 14 is again capable of executing the algorithm 18, it can be correctly initialized by executing the active-wakeup phase 148. For example, in a particular embodiment, the calculator 14 toggles to the unavailability phase when it is too busy to execute the algorithm 18. Henceforth, when the calculator 14 is again available to execute the algorithm 18, phase 148 is executed and the algorithm 18 is correctly initialized. Similarly, when the algorithm 18 is executed on a remote server, the cause which brings about the stopping of the execution of the algorithm 18 may be an interruption of the link between the device 10 and this remote server.

Variants of the Active-Wakeup Phase 148:

In variants, the algorithm 20 is identical to the algorithm 18, except that the algorithm 20 is executed offline and that it processes the compressed path, rather than directly all the intermediate measurements established during the unavailability phase. In this case, it is adjusted to take account of the fact that the distances between the characteristic points are generally larger than the distance of a stride. For example, the initial number $N_0$ of particles is much larger during the execution of the algorithm 20, than when the algorithm 18 is executed.

As a variant, the calculator 14 does not record, before the instant $t_1$, the position $P^i_k$, the value $W^i_k$ of the weight $w^i$ and the values $\alpha^i_k$ and $\varepsilon^i_k$ for all the particles $S^i$ but only for a limited number $N_1$ of particles so as to limit the memory space occupied by this recording. For example, the calculator 14 replaces each cluster of particles by a single particle $S^i_{t1}$ whose position is equal to the barycenter of the positions $P^i_k$ of each particle of this cluster. The barycenter is calculated on the basis of the positions $P^i_k$ of each particle of this cluster weighted by the weight $w^i_k$ of this particle. It is also possible to weight each position $P^i_k$ by the same weight w. A cluster of particles is a group of particles, all situated a distance of less than a threshold $S_a$ from the barycenter of this cluster. It is therefore possible to determine whether or not a particle belongs to a cluster and thus to identify all the particles which belong to the same cluster. For example, the threshold $S_a$ is less than or equal to 2 m or 1 m or 50 cm. The value $w^i_{t1}$ of the weight $w^i$ of the particle $S^i_{t1}$ is calculated on the basis of the weights $w^i$ of all the particles $S^i$ belonging to this cluster. For example, the weight $w^i_{t1}$ is equal to the mean of the values $w^i_k$ of the weights of the particles belonging to this cluster.

In a very simplified embodiment, the calculator 14 records only the position $PA_k$ estimated immediately before the instant $t_1$ as position $P^i_{t1}$. In this case, there therefore exists only a single position $P^i_{t1}$.

As a variant, the weights $w^i$ are reinitialized on exiting the unavailability phase. For example, the same value $w^i_{t2}$ is assigned to all the weights $w^i$. Typically, this value is taken equal to $1/N_2$, where $N_2$ is the number of particles $S^i$ at the instant $t_2+\Delta t_2$. The value $w^i_{t2}$ can also be calculated as a function of the value $w^i_{t1}$ and of the weight of the finishing node of the most probable route used to construct the position $P^i_{t2}$.

On exiting the unavailability phase, it is also possible to reinitialize the values of the corrective factors $\alpha^i$ and $\varepsilon^1$, as described during step 100.

Step 198 can be omitted. In this case, all the particles $S^i$ recorded at the instant $t_1$ are used. In another embodiment, step 198 is carried out just before the recording step 134. Next, during step 134, only the data of the particles selected during step 198 are recorded. In this case, step 198 is not generally carried out again at the start of phase 148.

To simplify the method, step 200 can be omitted. In this case, the path logged during the unavailability phase is corrected solely by executing step 228.

In another embodiment, during step 200, only one of the corrective factors $\alpha^i$ and $\epsilon^i$ is used to correct the logged path, rather than both. In another variant, the path is corrected by taking account of all the values $\alpha^i_{t1}$ and $\epsilon^i_{t1}$ of all the particles $S^i$. For example, the path is corrected on the basis of the mean of all the values $\alpha^i_{t1}$ and of the mean of all the values $\epsilon^i_{t1}$. This mean can be weighted with the weights $w^i_{t1}$ of each particle $S^i$. In this case, the corrected path is the same for all the particles $S^i$.

During step 250, rather than selecting only the most probable route, the calculator 14 selects the $N_{rt}$ most probable routes, where $N_{rt}$ is an integer strictly greater than 1 and generally less than 5 or 3. Thereafter, step 252 is applied for each of these $N_{rt}$ most probable routes. The positions $P^i_{t2}$ of $N_{rt}$ particles are thus initialized on the basis of a single particle $S_i$ whose position $P^i_{t1}$ has been recorded.

The position $P^i_{t2}$ of a particle at the instant $t_2$ does not necessarily coincide with the position of the finishing point of the logged path. For example, it can also be constructed by adding the random variables $\mu^i_x$ and $\mu^i_y$ to the coordinates of the position of the finishing point of this path. In another embodiment, it is also possible to add the random variables $\mu^i_x$ and $\mu^i_y$ to the coordinates of the starting point of the path used.

In another variant of phase 148, to obtain the positions $P^i_{t2}$, the calculator 14 makes each particle $S^i$ whose position has been recorded just before the instant $t_1$ travel the path logged during the unavailability phase without executing step 228. Thus, during this travel, the calculator 14 takes no account of the impenetrable obstacles. The algorithm 20 does not therefore use the graph 150 of the possible paths. The positions of these particles $S^i$ after they have traveled the path logged during the unavailability phase are then considered to be the positions $P^i_{t2}$ necessary for the initialization of the algorithm 18 at the instant $t_2+\Delta t_2$.

In another variant, the nodes of the graph 150 are not uniformly distributed in the building 2. For example, the graph 150 comprises a single node per room or per intersection between two rooms.

As a variant, to limit the number of operations carried out during the execution of the algorithm 20, the latter is modified so as to:
- stop exploring a hypothetical route as soon as the weight associated with a downstream node of this hypothetical route becomes less than a predetermined threshold, doing so before all the segments of the corrected path have been used, and/or
- limit the number of downstream nodes that the calculator 14 can identify, for example, to a single downstream node, and/or
- replace in the corrected path the segments whose length is less than a predetermined threshold with a single characteristic point, for example situated in the middle of this short segment, and/or
- apply the algorithm 20 solely to the particles whose weight is strictly greater than a predetermined threshold, and/or
- apply the algorithm 20 solely to the particles that are spaced apart by a distance greater than a predetermined threshold, and/or
- merge several segments of the corrected path into a single segment.

Phase 148 can also be executed in parallel with phase 122, that is to say at the same time as the calculator 14 is in its active phase and is executing the algorithm 18. In this case, the positions estimated by the execution of the algorithm 20 are combined with the positions estimated for the same instant $t_k$ by the algorithm 18 so as to improve the precision of estimation of the position of the device 10. For example, phase 148 is executed at regular intervals in parallel with phase 122.

Other Variants:

Execution of the method of FIG. 4 can be launched automatically, for example, in response to the loss of a GPS signal or in response to the measurement of a Wifi signal.

The estimated position $PA_k$ is not necessarily displayed but, as a variant, only transmitted to another device for processing of this information.

Everything described previously also applies to the case where the pedestrian 4 is replaced with a person equipped with a rolling vehicle such as a bike, a trolley or a stroller or else a wheelchair. The device 10 is then either transported by this person or deposited directly on the rolling vehicle. In this case, the accelerometer 24 can be replaced with a revolution-counter which measures the number of wheel revolutions of the rolling vehicle as this person moves around in the building 2.

The previously described method applies to any type of three-dimensional or two-dimensional space where the device 10 can be moved. For example, it may also be a space situated outdoors and outside of any building. For example, this method is useful for locating a person in a place where location by GPS or on the basis of telephone relay is impossible.

The use of additional characteristic points, such as was described previously, can be implemented independently of the various steps described to initialize the algorithm 18 on exiting the unavailability phase. For example, the algorithm 20 can be used in a mobile device whose calculators never toggle to an unavailability phase.

Other Applications:

It will be noted that the teachings described previously within the framework of a device and of a method for locating this device moved inside a three-dimensional space can also be implemented within the framework of other applications. In particular, these teachings apply to any device furnished with one or more sensors delivering measurements, the device being associated with at least one measurement calculator and an applications calculator. The measurement calculator, generally onboard the device and connected directly to the sensors, is programmed to operate in a "real-time" mode and, in alternation, in a storage mode. In the real-time mode, the measurement calculator transfers, as and when they are established, the intermediate measurements destined for the application calculator. In the storage mode, the measurement calculator logs and records, in a memory which is associated therewith, characteristics extracted from the signals measured by the sensor or sensors so as to limit the amount of information to be recorded and processed by the applications calculator.

The application calculator toggles, automatically or in response to a command transmitted by a user, between an active phase and an unavailability phase. In its active phase, the application calculator is able to process the new intermediate measurements transmitted by the measurement calculator as and when they are received. Conversely, in its unavailability phase, the application calculator is not capable of processing the new measurements as and when they are transmitted to it. Moreover, the applications calculator is programmed to, when it is in its active phase:

execute a first algorithm which leads it to receive the intermediate measurements transferred in real time by the measurement calculator and to process them as and when they are received so as to estimate in real time a new value of a datum, and, in alternation, execute a second algorithm which leads it to process the characteristics extracted, by the measurement calculator, during the unavailability phase, so as to deduce therefrom a value of this same datum but on the basis of the characteristics logged during this unavailability phase.

Figure 10:
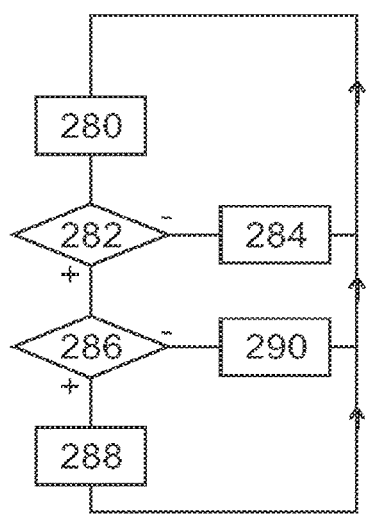
FIG. 10 is a flowchart of a method for processing the measurements of at least one sensor housed in a device such as the device of FIG. 2A.

In this more general case, the method for processing the measurements runs as described with reference to FIG. 10. Initially, during a step 280, the measurement calculator acquires the new measurements carried out by the sensor or sensors and record the intermediate measurements established on the basis of these measurements in a memory such as the memory 44.

Thereafter, during a step 282, the measurement calculator determines whether or not the applications calculator is in its unavailability phase. If it is determined that the applications calculator is in its unavailability phase, then the measurement calculator undertakes a step 284. In the converse case, the calculator undertakes a step 286.

During step 284, the measurement calculator toggles or remains in its storage mode to store the characteristics extracted from the measurements of the sensor or sensors. Indeed, it cannot in this case transmit the new intermediate measurements to the application calculator as and when they are carried out. During step 284 the measurement calculator records, per unit time, less information in the memory 44 than during the active phase. Thus, during step 284 the level of compression of the measurements of the sensor or sensors is higher than the level of compression of these same measurements during the active phase.

During step 286, the measurement calculator determines whether the application calculator has just exited its unavailability phase and returns to its active phase. In the affirmative, it undertakes a step 288. In the converse case, it undertakes a step 290.

During step 288, the measurement calculator transmits the characteristics recorded during step 284 to the application calculator. Thereafter, still during this step 288, the application calculator executes an active-wakeup phase during which it processes the characteristics received so as to estimate a value of a datum at an instant $t_w$ included in the time interval]$t_1$; $t_2$]. The time interval]$t_1$; $t_2$] is the time interval included between the instants $t_1$ and $t_2$ and which includes the instant $t_2$ but which does not include the instant $t_1$. As previously, the instants $t_1$ and $t_2$ are, respectively, the instant at which the application calculator toggles to its unavailability phase and the instant at which the application calculator returns to its active phase. It will be noted that the instant $t_w$ is not necessarily equal to the instant $t_2$. For example, it may be useful to have the position of the device 10 at an intermediate instant between the instants $t_1$ and $t_2$.

Thereafter, once the active-wakeup phase has terminated, the method returns to step 280.

During step 290, the calculator is in its active phase and the active-wakeup phase has terminated. In the latter case, the measurement calculator is in its real-time mode and the application calculator executes an algorithm which processes the new intermediate measurements as and when they are received. In its real-time mode, the measurement calculator records, by unit time, more information in the memory 44 than during step 284. Thus, during the active phase, the level of compression of the measurements of the sensor or sensors is lower than the level of compression of these same measurements during the unavailability phase.

By way of example, the sensors are sensors allowing the tracking of human activity. For example, these sensors measure the movements and the orientation of the body of the person and/or the movements of the limbs of this person with respect to one another. In this case the datum whose successive values must be estimated on the basis of the measurements of the sensors is a datum representative of a human activity such as sitting down, walking, running, sleeping or the like. The implementation of the method of FIG. 10 in this context allows the application calculator to estimate the person's activity by taking into account the characteristics logged during their unavailability phase. Moreover, in this type of application, the switch from the unavailability phase to the active phase of the application calculator can be triggered by the detection, by the measurement calculator, of a characteristic associated with a movement of the person reflecting their wakeup, for example a movement of an arm by an amplitude exceeding a predetermined threshold.

In another exemplary application, the electronic sensor is an audio sensor which measures an audible audio signal in the immediate environment of the device. In this case, the first and second algorithms are, for example, voice recognition algorithms and the values of the datum which have to be estimated correspond to words spoken successively by a human being. The first algorithm performs the voice recognition as and when the new measurements of the sensor are received. The second algorithm is for its part designed to identify words on the basis of certain characteristics, such as for example, a spectrum of frequencies or the intensity of the audio signal at certain predetermined frequencies. In this case, during the unavailability phase, the measurement calculator is programmed to extract from the measured audio signal the characteristics required for voice recognition by the second algorithm. For example, these characteristics are the intensities of the audio signal at the predetermined frequencies. On completion of the unavailability phase, during the active-wakeup phase, the application calculator executes the second algorithm to identify words spoken just before or at the time when this application calculator has returned to its active phase. Thereafter, subsequent to the return to the active phase, the application calculator again executes the first algorithm to recognize the following words on the basis of the measurements which are transmitted to it by the measurement calculator.

In another variant, the first algorithm uses the previously recognized words to recognize the following words. In this case, the words spoken during the unavailability phase and identified during the active-wakeup phase subsequent to the execution of the second algorithm are used, during the first following execution of the first algorithm, to aid recognition of the words in the audio signal measured after the return to the active phase. For example, the first algorithm uses, in addition to the new measurements of the audio signal, the knowledge of the words previously identified by the second algorithm to refine and augment the reliability of the recognition of the following words. Indeed, it is known that it is easier to identify a word when the context in which it was spoken is known, rather than in the absence of any information about what was said just before.

The invention claimed is:

1. A method for processing measurements of at least one electronic sensor, housed in a portable device by a user, to deduce therefrom values of a datum at successive instants over time, the method comprising:

during an active phase:
a first calculator acquiring, at instants $t_a$, where a is an index integer number, respective measurements of the at least one electronic sensor, and generating, at each instant $t_k$, where k is an index integer number, an intermediate measurement based on the measurements of the at least one electronic sensor acquired at the instants $t_a$, over a given time period during the active phase, a quantity of the instants $t_k$ being less than a quantity of the instants $t_a$ so that the first calculator thus carries out, during the active phase, a first compression of the measurements of the at least one electronic sensor; and
at each instant $t_k$, a second calculator executing a first algorithm for estimating a value $P^i_k$ of the datum, where i is an identifier for the datum, the executing comprising:
  reception of one of the intermediate measurements generated by the first calculator, the one intermediate measurement being more recent than an intermediate measurement received during a previous execution of the first algorithm, and then
  estimation of the value $P^i_k$ of the datum based on the one intermediate measurement received;
at an instant $t_{off}$, stopping the active phase and switching to an unavailability phase having a first duration and during which execution by the second calculator of the first algorithm is inhibited;
during the unavailability phase, the first calculator continuing to acquire, at predetermined instants, the measurements carried out by the electronic sensor during the unavailability phase and generate intermediate measurements;
wherein:
during the unavailability phase, the first calculator:
  logging characteristics of the signal measured by the electronic sensor based on the intermediate measurements generated during the unavailability phase, and
  recording the characteristics, a number of characteristics logged during the unavailability phase being strictly less than a number of intermediate measurements that are generated, during the active phase, by the first calculator for a period of a second duration the same as the first duration of the unavailability phase so that the first calculator thus carries out, during the unavailability phase, a second compression of the measurements of the at least one sensor with a higher compression rate than during the active phase;
at an instant $t_{on}$, stopping the unavailability phase and switching to an active-wakeup phase during which the second calculator executes a second algorithm for estimating a value $P^i_w$ of the datum at at least one instant $t_w$, where w is an index integer number, included in an interval from $t_{off}$ to $t_{on}$ based on the characteristics logged and recorded during the unavailability phase by the first calculator; and then
stopping the active-wakeup phase and returning to the active phase.

2. The method as claimed in claim 1, wherein:
during the active phase, the estimating of the value $P^i_k$ of the datum is carried out based on the one intermediate measurement received and as a function of the intermediate measurements received solely before the instant $t_k$; and
during the active-wakeup phase, the second algorithm executed is different from the first algorithm in that it estimates a value $P^i_w$ for the instant $t_w$ included in the interval based on characteristics logged during the unavailability phase both before and after the instant $t_w$.

3. The method as claimed in claim 1, wherein:
during the active phase, the estimating of the value $P^i_k$ of the datum is carried out based on the one intermediate measurement received and also based on a previous value $P^i_{k-1}$ of the datum estimated during the previous execution of the first algorithm at the instant $t_{k-1}$; and
during the first execution of the first algorithm after the stopping of the active-wakeup phase, the previous value $P^i_{k-1}$ of the datum required to estimate the value $P^i_k$ of the datum is constructed based on the value $P^i_w$ provided by the execution of the second estimation algorithm during the active-wakeup phase.

4. The method as claimed in claim 3, wherein:
the electronic sensor comprises an inertial platform onboard the portable device configured to measure a physical quantity representative of direction of movement of the device and of amplitude of displacement between a previous instant $t_{k-1}$ and the instant $t_k$;
each intermediate measurement comprises direction $\theta_k$ and amplitude $I_k$ of displacement of the device between the instants $t_{k-1}$ and $t_k$;
the datum is location of the portable device inside a space and each value of the datum comprises at least one possible position $P^i_k$ of the device inside the space;
the first and the second estimation algorithms are algorithms for estimating at least one possible position $P^i_k$ of the device inside the space;
at each instant $t_k$, the executing of the first algorithm, by the second calculator, generates at least one possible position $P^i_k$ based on at least one possible position $P^i_{k-1}$ estimated with aid of the first algorithm at the previous instant $t_{k-1}$;
before the instant $t_{off}$, at least one last possible position $P^i_{toff}$ is constructed based on the possible position $P^i_k$ generated at the instant $t_k$ immediately preceding the instant $t_{off}$, and then recorded;
during the unavailability phase, the logged characteristics comprise a temporally ordered series of characteristic points of a path traveled by the device during the unavailability phase, the series of characteristic points constituting a logging of the path traveled by the device during the unavailability phase;
during the active-wakeup phase, the execution of the second algorithm estimates at least the value $P^i_{ton}$ at the instant $t_{on}$ based on the last constructed position $P^i_{toff}$ and the path traveled logged during the unavailability phase, the value $P^i_{ton}$ at the instant $t_{on}$ as an initial position $P^i_{ton}$; and
during the first execution of the first algorithm after the instant $t_{on}$, the previous position $P^i_{k-1}$ is constructed based on the initial position $P^i_{ton}$.

5. The method as claimed in claim 4, wherein:
at each instant $t_k$, the executing of the first algorithm, by the second calculator, generates plural possible positions $P^i_k$ based on plural possible positions $P^i_{k-1}$ estimated with aid of the first algorithm at the previous instant $t_{k-1}$;
before the instant $t_{off}$, plural different possible positions $P^i_{toff}$ are constructed based on the possible positions $P^i_k$ generated at the instant $t_k$ immediately preceding the instant $t_{off}$, and then recorded;
during the active-wakeup phase, the executing of the second algorithm generates plural initial positions $P^i_{ton}$, accordingly each initial position $P^i_{ton}$ is estimated based on a last respective constructed position $P^i_{toff}$ and the path traveled logged during the unavailability phase; and during the first execution of the first algorithm after the instant $t_{on}$, each previous position $P^i_{k-1}$ is constructed based on a respective possible initial position $P^i_{ton}$.

6. The method as claimed in claim 5, wherein the construction of the plural last initial positions $P^i_{toff}$ comprises:

selection of M most probable positions of the device based on weights associated with the estimated positions $P^i_k$ generated at the instant $t_k$ immediately preceding the instant $t_{off}$, wherein M is an integer greater than two and strictly less than the number of possible positions $P^i_k$ generated by the execution of the first algorithm at the instant $t_k$ immediately preceding the instant $t_{off}$, and each weight associated with a respective possible position $P^i_k$ represents probability that the device is situated in this position $P^i_k$; and then recording as last possible positions $P^i_{toff}$ of only the M most probable positions identified.

7. The method as claimed in claim 4, wherein the executing of the second algorithm comprises:

correction of a path logged during the unavailability phase with aid of a set of predefined constraints on displacements of the device in the space, the correction comprising modifications of distances between the characteristic points of the logged path and modifications of amplitudes of changes of direction at a level of the characteristic points of the logged path to obtain a corrected path that does not infringe any of the predefined constraints, each modification being carried out while taking account both of the characteristic points situated upstream and also of situated downstream of the characteristic point affected by the modification of the distance or of the amplitude of the change of direction; and then constructing the estimation of the initial position $P^i_{ton}$ comprises:

positioning an origin of the corrected path as a function of the last position $P^i_{toff}$ estimated by the execution of the first algorithm; and then obtaining the position $P^i_{ton}$ based on the position of a finishing point of the corrected path when the origin of the corrected path has been positioned.

8. The method as claimed in claim 4, wherein:

at each instant $t_k$, the first algorithm also calculates a value of a corrective factor of a measurement bias affecting one of the sensors embedded inside the device; and the method comprises correction of the path traveled logged during the unavailability phase to obtain a corrected path, the correction being carried out by applying to the intermediate measurements arising from the embedded sensor the corrective factor calculated at the instant $t_k$ immediately preceding the instant $t_{off}$; and then the position $P^i_{ton}$ is estimated by using the corrected path.

9. The method as claimed in claim 4, wherein, when it is executed by the second calculator, the first algorithm estimates the position $P^i_k$ of the device by using a set of predefined constraints on displacements of the device in the space.

10. The method as claimed in claim 1, wherein:

the electronic sensor comprises an inertial platform onboard the portable device configured to measure a physical quantity representative of direction of movement of the device and of amplitude of displacement between a previous instant $t_{a-1}$ and the instant $t_a$;

each intermediate measurement comprises direction $\theta_k$ and amplitude $I_k$ of displacement of the device between the instants $t_{k-1}$ and $t_k$;

the datum is a location of the portable device inside a space and each value of the datum comprises at least one possible position $P^i_k$ of the device inside the space;

the first and the second estimation algorithms are algorithms for estimating at least one possible position $P^i_k$ of the device inside the space, during the unavailability phase, the characteristics logged comprise characteristic points of a path traveled by the device during the unavailability phase, the logging of the characteristics of the measured signal comprising:

identification, based on the intermediate measurements generated by the first calculator during the unavailability phase, of characteristic points of the path that are less numerous than the intermediate measurements generated during the unavailability phase; and for each pair of successive identified characteristic points along the path, approximation of the path of the device between the two characteristic points by a polynomial whose coefficients are determined.

11. The method as claimed in claim 10, wherein the identification of characteristic points of the path comprises identification, as a characteristic point of the path, of each point where the amplitude of a change of direction of movement of the device exceeds a predetermined threshold.

12. The method as claimed in claim 11, wherein the identification of characteristic points of the path further comprises identification of an additional characteristic point each time at least one of the following conditions is satisfied:

distance traveled since the last identified characteristic point is greater than a predetermined threshold, amplitude of a pressure variation measured by an onboard pressure sensor embedded inside the device is greater than a predetermined threshold, amplitude of a displacement of the device with respect to a body of a person who is manually transporting the device is greater than a predetermined threshold, or elapsed time since the last identified characteristic point is greater than a predetermined threshold.

13. A non-transitory information recording medium, comprising instructions for executing a method in accordance with claim 1, when the instructions are executed by an electronic calculator.

14. The method as claimed in claim 1, comprising:

the second calculator notifying the first calculator when the second calculator switches to the unavailability phase.

15. The method as claimed in claim 1, comprising:

the first calculator switching the second calculator to the active phase based upon an amount of data of the recorded characteristics;

the second calculator executing the second algorithm using the recorded characteristics;

returning the second calculator to the unavailability phase; and erasing the recorded characteristics.

16. An electronic unit for processing measurements of at least one electronic sensor to deduce therefrom values of a datum at successive instants over time, the electronic unit comprising at least one first and one second electronic calculator, in which:

the first calculator is programmed to, during an active phase, acquire, at instants $t_a$, where a is an index integer number, the measurements of the at least one electronic sensor, and then generate, at each instant $t_k$, where k is an index integer number, an intermediate measurement based on the measurements acquired at the instants $t_a$, over a given time period, a number of instants $t_k$ being less than a number of the instants $t_a$ so that the first calculator thus carries out, during the active phase, a first compression of the measurements of the at least one sensor;

the second calculator is programmed to:
  execute, during the active phase, at each instant $t_k$, a first algorithm for estimating a value $P^i_k$ of the datum, where i is an identifier for the datum, the execution comprising:
    reception of one intermediate measurement generated by the first calculator, the one intermediate measurement being more recent than an intermediate measurement received during a previous execution of the first algorithm; and then
    estimation of the value $P^i_k$ of the datum based on the one intermediate measurement received;
  at an instant $t_{off}$, stop from the active phase and switch to an unavailability phase having a first duration and during which execution by the second calculator of the first algorithm is inhibited;

the first calculator is programmed to, during the unavailability phase:
  continue to acquire, at predetermined instants, measurements carried out by the electronic sensor during the unavailability phase;

wherein:
the first calculator is further programmed to, during the unavailability phase:
  log characteristics of the signal measured by the electronic sensor based on the measurements acquired during the unavailability phase, and
  record the characteristics, a number of characteristics logged during the unavailability phase being strictly less than a number of intermediate measurements that are generated, during the active phase, by the first calculator for a period of a second duration the same as the first duration of the unavailability phase so that the first calculator thus carries out, during the unavailability phase, a second compression of the measurements of the at least one sensor with a higher compression rate than during the active phase; and the second calculator is further programmed to:
  at an instant $t_{on}$, stop the unavailability phase and switch to an active-wakeup phase during which the second calculator executes a second algorithm for estimating a value $P^i_w$ of the datum, where w is an index integer number, at at least one instant $t_w$ included in an interval from $t_{off}$ to $t_{on}$ based on the characteristics logged and recorded during the unavailability phase by the first calculator; and then
  stop from the active-wakeup phase and return to the active phase.

17. A device directly transportable in a hand by a human being, the device comprising:
  at least one electronic sensor configured to measure a physical quantity; and
  an electronic unit as claimed in claim 16, the electronic unit being linked up to the electronic sensor.

* * * * *